United States Patent [19]

Satomura et al.

[11] Patent Number: 5,485,433

[45] Date of Patent: Jan. 16, 1996

[54] INFORMATION RECORDING METHOD AND APPARATUS FOR DETERMINING WHETHER RECORDING HAS BEEN CORRECTLY PERFORMED

[75] Inventors: Seiichiro Satomura; Katuya Yamazaki, both of Yokohama; Kazuyoshi Ishii, Tokyo, all of Japan

[73] Assignee: Canon Kabushiki Kaisha, Tokyo, Japan

[21] Appl. No.: 991,447

[22] Filed: Dec. 16, 1992

[30] Foreign Application Priority Data

Dec. 19, 1991 [JP] Japan .................................. 3-354085
Apr. 10, 1992 [JP] Japan .................................. 4-118196

[51] Int. Cl.$^6$ ................................................. G11B 11/00
[52] U.S. Cl. ........................... 369/13; 369/54; 369/58; 360/114
[58] Field of Search .................. 369/13, 14, 54, 369/58–59, 47–48, 124, 32, 100, 110, 109, 275.2, 283, 121; 360/59, 114; 365/122

[56] References Cited

U.S. PATENT DOCUMENTS

| | | | |
|---|---|---|---|
| 4,688,204 | 8/1987 | Noyes, Jr. et al. | 369/59 |
| 4,879,703 | 11/1989 | Kaku et al. | 369/13 |
| 5,189,650 | 2/1993 | Watanabe et al. | 369/13 |

FOREIGN PATENT DOCUMENTS

| | | |
|---|---|---|
| 0240231 | 10/1987 | European Pat. Off. . |
| 0294761 | 12/1988 | European Pat. Off. . |
| 61-016033 | 1/1986 | Japan . |
| 63-117353 | 5/1988 | Japan . |
| 03049077 | 3/1991 | Japan . |
| 03073448 | 3/1991 | Japan . |
| 373448 | 3/1991 | Japan . |
| 03156775 | 7/1991 | Japan . |

*Primary Examiner*—Ali Neyzari
*Attorney, Agent, or Firm*—Fitzpatrick, Cella, Harper & Scinto

[57] ABSTRACT

A method of recording new information on a recording medium on which information was previously recorded is performed as follows. The new information is stored in a memory. The new information is overwritten onto a portion of the recording medium where the old information was recorded by scanning the recording medium with a light beam. A signal including both the old information and the new information is reproduced from the light beam reflected by the recording medium simultaneously with the overwriting. A signal component corresponding to the new information is extracted from the reproduced signal. The extracted signal component is compared with the new information stored in the memory. It is determined on the basis of a comparison result whether or not the recording has been correctly performed.

35 Claims, 21 Drawing Sheets

FIG. 3A RECORDING SIGNAL
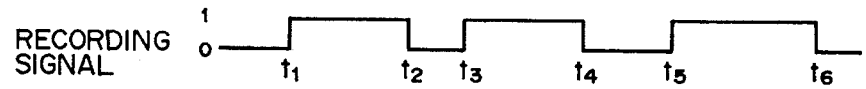
FIG. 3B REPRODUCTION SIGNAL
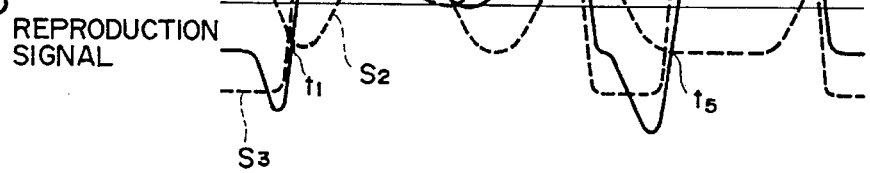
FIG. 3C OUTPUT OF FILTER
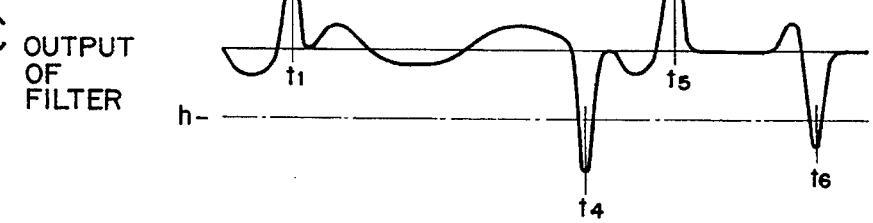
FIG. 3D OUTPUT OF COMPARATOR
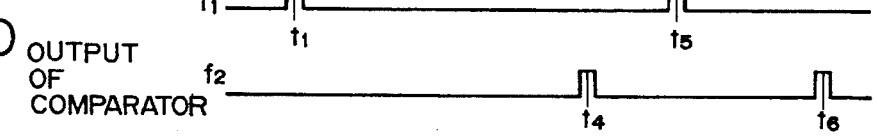
FIG. 3E OUTPUT OF SIGNAL GENERATION CKT
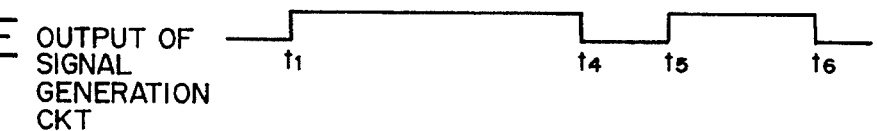

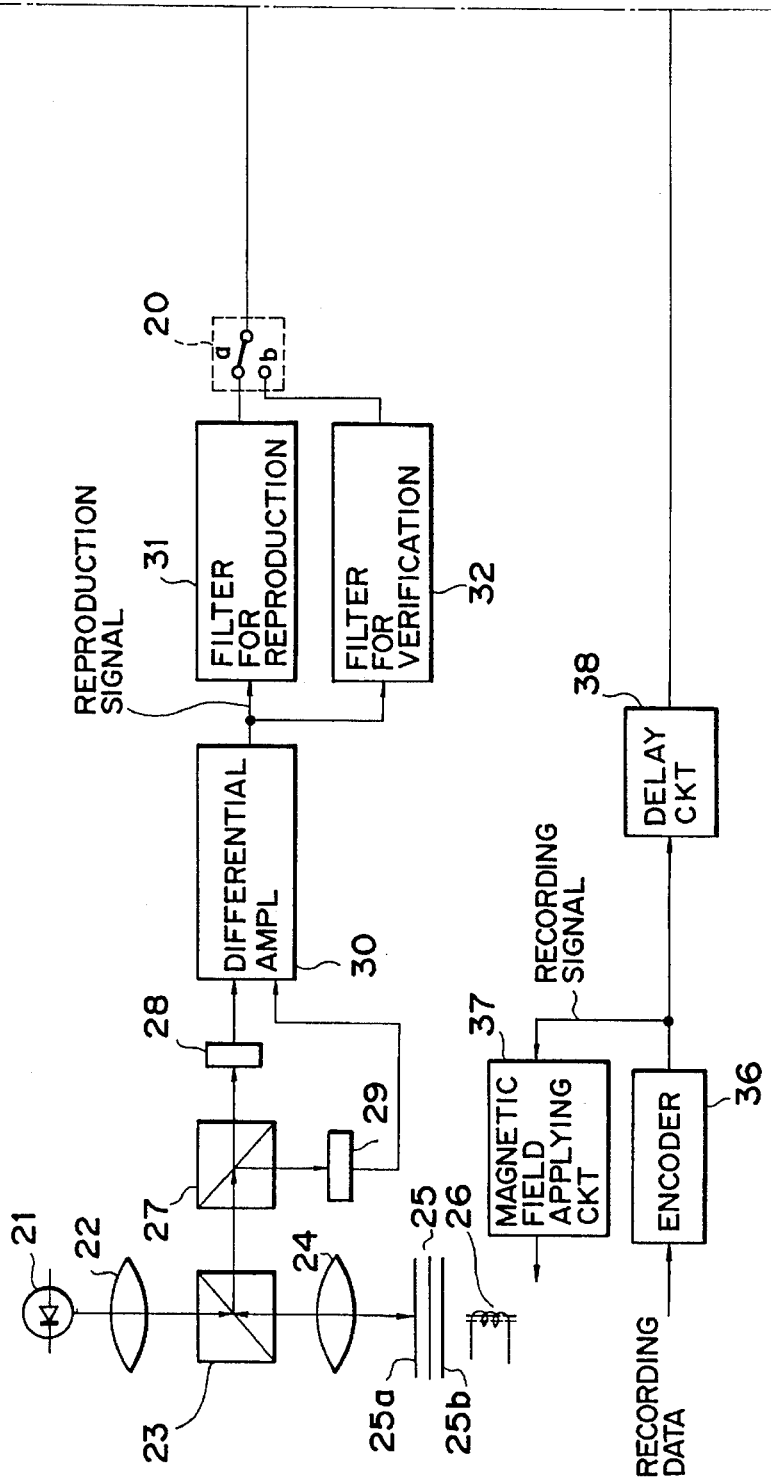

FIG. 6A  RECORDING SIGNAL

FIG. 6B  REPRODUCTION SIGNAL AFTER DELECTION OF OLD DATA

FIG. 6C  REPRODUCTION SIGNAL ON OVERWRITING

FIG. 6D  REPRODUCTION SIGNAL ON NORMAL REPRODUCTION

FIG. 6E  FILTER OUTPUT FOR VERIFICATION

FIG. 6F  OUTPUT OF BINARIZING CKT ON VERIFICATION

FIG. 6G  FILTER OUTPUT FOR REPRODUCTION

FIG. 6H  OUTPUT OF BINARIZING CKT ON NORMAL REPRODUCTION

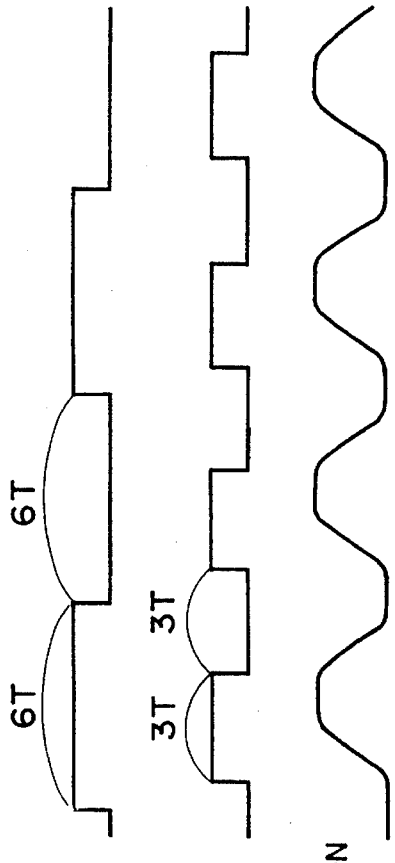
FIG. 12A  6T PATTERN SIGNAL
FIG. 12B  3T PATTERN SIGNAL
FIG. 12C  NORMAL REPRODUCTION SIGNAL
FIG. 12D  REPRODUCTION SIGNAL DETECTED SIMULTANEOUSLY WITH RECORDING
FIG. 12E  SIGNAL OBTAINED BY BINARIZING d

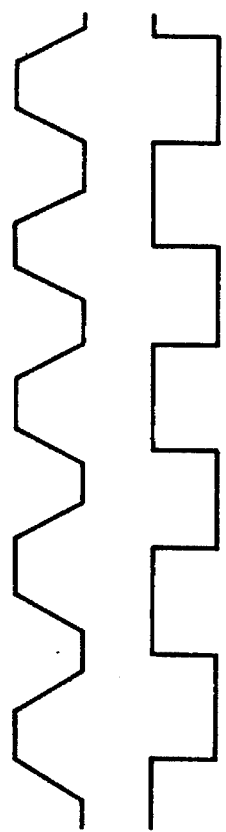
FIG. 13A  OLD INFORMATION SIGNAL COMPONENT
FIG. 13B  RECORDING SIGNAL
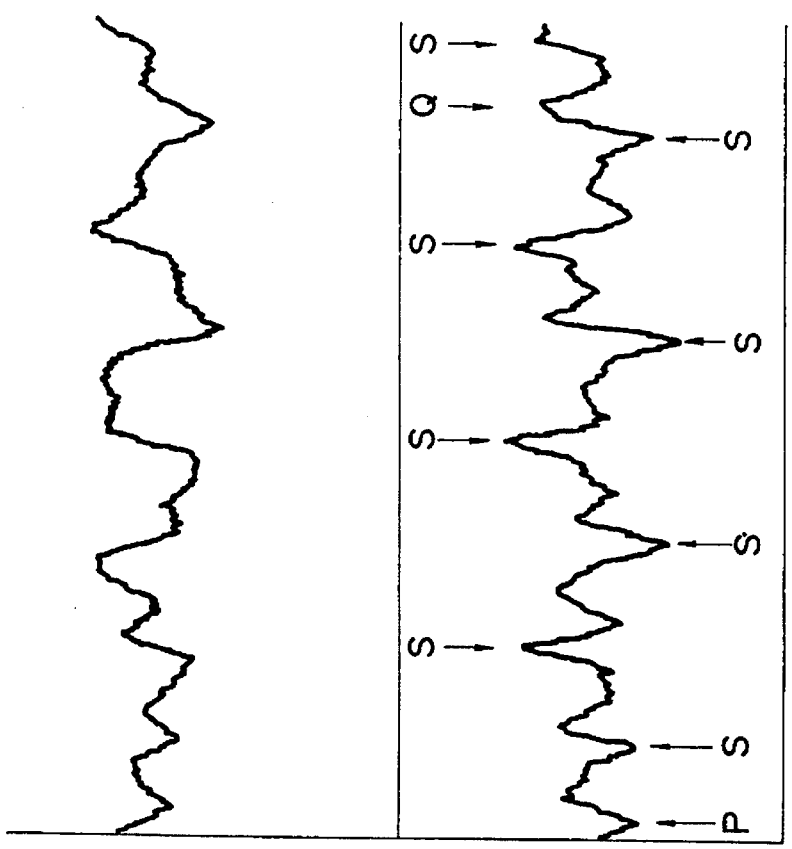
FIG. 13C  REPRODUCTION SIGNAL
FIG. 13D  OUTPUT SIGNAL OF FILTER FOR VERYFYING

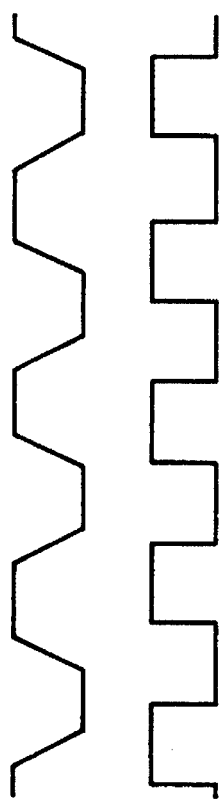
FIG. 14A  OLD INFORMATION SIGNAL COMPONENT
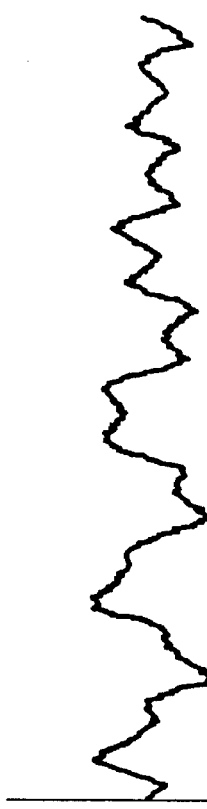
FIG. 14B  RECORDING SIGNAL
FIG. 14C  REPRODUCTION SIGNAL
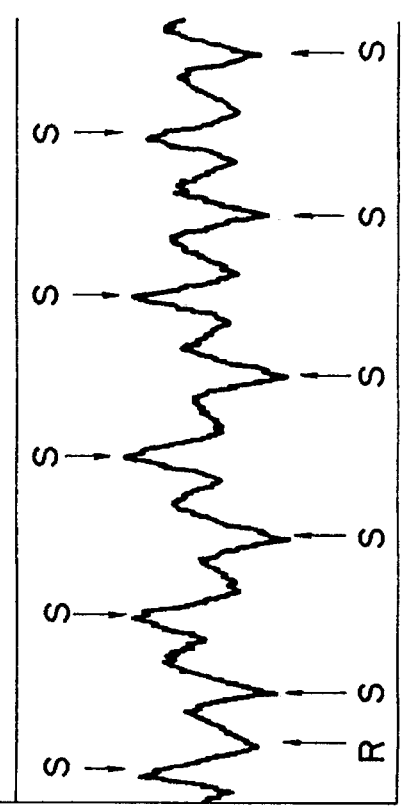
FIG. 14D  OUTPUT SIGNAL OF FILTER FOR VERYFYING FIG. 17A  RECORDING SIGNAL
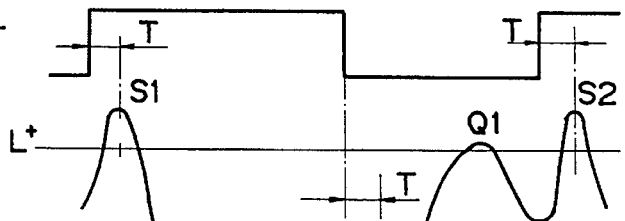

FIG. 17B  REPRODUCTION SIGNAL FOR VERIFICATION
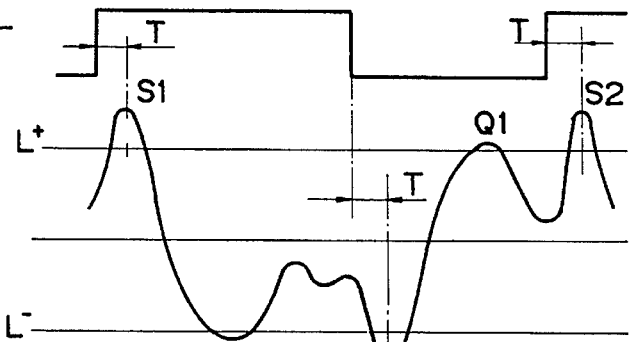

FIG. 17C  BINARY SIGNAL OF COMPARATOR 23
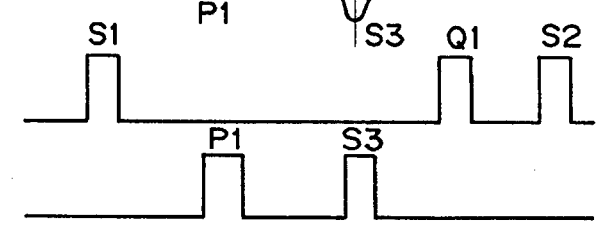

FIG. 17D  BINARY SIGNAL OF COMPARATOR 24
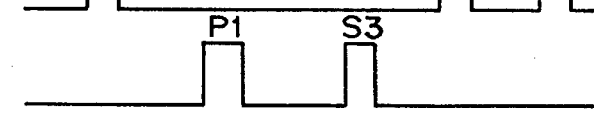

FIG. 17E  OUTPUT SIGNAL OF DELAY 25
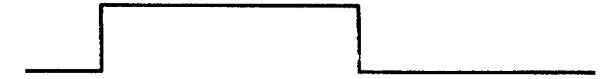

FIG. 17F  OUTPUT SIGNAL OF DELAY 27

FIG. 17G  CLOCK

FIG. 17H  OUTPUT OF FLIP-FLOP CKT 28

FIG. 17I  OUTPUT OF FLIP-FLOP CKT 29

FIG. 17J  OUTPUT OF FLIP-FLOP CKT 30

FIG. 17K  OUTPUT OF FLIP-FLOP CKT 31
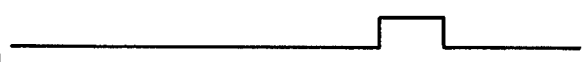

FIG. 17L  OUTPUT OF FLIP-FLOP CKT 32

FIG. 17M  OUTPUT OF SHIFT RESISTER 33
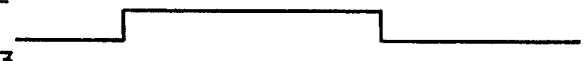

FIG. 17N  OUTPUT OF COMPARISON CKT 34

INFORMATION RECORDING METHOD AND APPARATUS FOR DETERMINING WHETHER RECORDING HAS BEEN CORRECTLY PERFORMED

BACKGROUND OF THE INVENTION

1. Field of the Invention

The present invention relates to a method and apparatus for recording information on an information recording medium such as a magnetooptical disk and, more particularly, to an information recording method and apparatus, which serve to perform so-called direct verification for confirming recorded information simultaneously with recording.

2. Related Background Art

As a recording method for a magnetooptical recording apparatus, an optical modulation method, a magnetic field modulation method, and the like are known. The magnetic field modulation method is superior to other methods since it can directly overwrite new data on old data. FIG. 1 is a schematic view showing an arrangement of a magnetooptical recording apparatus adopting the magnetic field modulation method. In a magnetooptical disk 1 as an information recording medium, a magnetooptical recording layer 3 is formed on a transparent substrate 2, and a protective layer 4 is formed on the upper surface of the recording layer 3. The magnetooptical disk 1 is rotated at a constant speed by driving a spindle motor 5. Furthermore, a magnetic head 6 is arranged above the upper surface of the magnetooptical disk 1, and an optical head 7 is arranged below the lower surface of the disk 1 so as to oppose the magnetic head 6.

When information is recorded on the magnetooptical disk 1 by the magnetooptical recording apparatus, a laser beam emitted from the optical head 7 is radiated on the magnetic recording layer 3 to form a beam spot having a spot size of about 1 μm, while the disk 1 is rotated at high speed. Upon radiation of the laser beam, the temperature of the recording layer 3 is increased to be higher than the Curie temperature of the layer. At the same time, the magnetic head 6 applies, onto the heated portion, a bias magnetic field modulated according to recording information by driving a drive circuit 8. Thus, the direction of magnetization of the heated portion of the magnetooptical recording layer 3 is oriented in the direction of the bias magnetic field. Upon movement of the beam spot, as the heated portion is cooled, the direction of the magnetization on the recording layer 3 is fixed, and information is recorded as a pit.

When the above-mentioned information recording is performed, information cannot often be normally recorded due to defects, deterioration, or corrosion of the magnetooptical disk 1, dust attached onto the disk 1, or the malfunction of the apparatus. For this reason, verification is normally performed. In this verification, recorded information is reproduced as a magnetooptical signal by the optical head after one revolution of the disk from the recording of the information, and the recording signal and the reproduction signal are compared to check if they are identical with each other. The reason why the verification is performed after one revolution of the disk is that a recording laser beam is normally used common to a reproduction laser beam, and it is difficult to reproduce recorded information simultaneously with recording or immediately after recording. However, the above-mentioned verification requires a time for two revolutions of the disk, i.e., a time required for recording information for one track (one revolution of the disk), and a time required for checking recorded information. Thus, the signal processing time is prolonged, and the recording speed is lowered.

In order to solve this problem, a magnetooptical recording method for reproducing a recording information signal from reflected light of a recording beam simultaneously with information recording, and checking if the recorded signal is identical with the signal to be recorded, is proposed in Japanese Laid-Open Patent Application No. 3-73448. Furthermore, the present applicant filed a further improved magnetooptical recording method of the above-mentioned method in U.S.S.N. 913,481 (filed on Jul. 14, '92). According to this magnetooptical recording method, since recording of an information signal and checking of recorded information can be simultaneously performed, the time required for checking the recorded information becomes unnecessary, and the information recording speed can be remarkably increased.

However, the above-mentioned magnetooptical recording method allows verification simultaneously with recording, i.e., one-beam direct verification using a single light source. In this case, a signal reproduced simultaneously with recording undesirably includes an old information component left on an information track. Therefore, if the number of old information components included in the reproduced signal is increased, the reliability of the verification signal is deteriorated due to crosstalk of the old information components. For this reason, it is demanded to further improve the reliability of verification.

SUMMARY OF THE INVENTION

It is an object of the present invention to solve the conventional problems, and to provide an information recording method and apparatus, which can reduce crosstalk of information, and can accurately verify recorded information.

In order to achieve the above object, according to one aspect of the present invention, there is provided a method of recording new information on a recording medium, on which information was previously recorded, comprising the steps of:

storing the new information in a memory;

overwriting the new information on the previously recorded information by scanning the medium with a light beam;

reproducing a signal including both the previously recorded information and the new information from the light beam reflected by the medium simultaneously with overwriting;

extracting a signal component corresponding to the new information from the reproduced signal;

comparing the extracted signal component with the new information stored in the memory; and determining based on a comparison result whether or not recording is normally performed.

There is also provided an apparatus for executing the above-mentioned recording method, and recording new information on a recording medium, on which information was previously recorded, comprising:

a memory for storing the new information;

overwriting means for overwriting the new information on the previously recorded information by scanning the medium with a light beam;

a photodetector for receiving the light beam reflected by the medium, and reproducing a signal including both the previously recorded information and the new information simultaneously with overwriting;

an extraction circuit for extracting a signal component corresponding to the new information from the signal reproduced by the photodetector;

a comparison circuit for comparing the signal component extracted by the extraction circuit with the new information stored in the memory; and a determining circuit for determining based on an output from the comparison circuit whether or not recording is normally performed.

According to another aspect of the present invention, there is provided a method of recording a recording signal on a magnetooptical recording medium, comprising the steps of:

storing the recording signal in a memory;

scanning the medium with a non-modulated light beam;

applying a magnetic field modulated according to the recording signal onto the medium simultaneously with scanning of the light beam;

reproducing a signal from the light beam reflected by the medium;

extracting a signal component corresponding to the recording signal from the reproduced signal;

comparing the extracted signal component with the recording signal stored in the memory; and determining based on a comparison result whether or not recording is normally performed.

There is also provided a magnetooptical recording apparatus for executing the above-mentioned recording method, comprising:

a memory for storing a recording signal;

an optical head for scanning a magnetooptical recording medium with a non-modulated light beam;

a magnetic head for applying a magnetic field modulated according to the recording signal on the medium;

a photodetector for receiving the light beam reflected by tile medium, and reproducing a signal;

an extraction circuit for extracting a signal component corresponding to the recording signal from the signal reproduced by the photodetector;

a comparison circuit for comparing the signal component extracted by the extraction circuit with the recording signal stored in the memory; and a determining circuit for determining based on a comparison result from the comparison circuit whether or not recording is normally performed.

According to still another aspect of the present invention, there is provided a method of recording a recording signal on a magnetooptical recording medium, and reproducing the recorded signal, comprising the steps of:

storing the recording signal in a memory;

scanning the medium with a non-modulated light beam of a recording power;

applying a magnetic field modulated according to the recording signal on the medium simultaneously with scanning of the light beam of the recording power;

reproducing a signal from the light beam of the recording power reflected by the medium;

extracting a high-frequency component of the signal reproduced from the light beam of the recording power;

generating a binary signal from the extracted high-frequency component;

comparing the binary signal generated from the high-frequency component with the recording signal stored in the memory;

determining based on a comparison result whether or not recording is normally performed;

scanning the medium on which the recording signal has been recorded with a light beam of a reproduction power lower that the recording power;

reproducing a signal from the light beam of the reproduction power reflected by the medium;

extracting a low-frequency component of the signal reproduced from the light beam of the reproduction power; and generating a binary signal from the extracted low-frequency component.

There is also provided a magnetooptical recording apparatus for executing the above-mentioned recording/reproduction method, comprising:

a memory for storing a recording signal;

an optical head for scanning a magnetooptical recording medium with a non-modulated light beam;

a magnetic head for applying a magnetic field modulated according to the recording signal on the medium;

a photodetector for receiving the light beam reflected by the medium, and reproducing a signal;

a first filter for extracting a high-frequency component of the signal reproduced by the photodetector;

a second filter for extracting a low-frequency component of the signal reproduced by the photodetector;

a binarizing circuit for generating a binary signal from outputs from the first and second filters;

a comparison circuit for comparing the binary signal generated by the binarizing circuit with the recording signal stored in the memory; and a determining circuit for determining based on a comparison result from the comparison circuit whether or not recording is normally performed.

According to still another aspect of the present invention, there is provided a method of recording a recording signal on a recording medium, and verifying the recorded signal, comprising the steps of:

recording a first test signal having a predetermined pattern on the medium;

overwriting a second test signal having a pattern different from the pattern of the first test signal on the medium on which the first test signal has been recorded;

reproducing a signal from the medium simultaneously with the overwriting;

comparing the reproduced signal with the second test signal to determine whether or not recording is normally performed;

recording the recording signal on the medium and performing verification simultaneously with recording of the recording signal when it is determined that recording is normally performed; and recording the recording signal on the medium and performing verification after completion of recording when it is determined that recording is not normally performed.

There is also provided an apparatus for executing the above-mentioned recording/verifying method, and recording a recording signal on a recording medium, and verifying the recorded signal, comprising:

a pattern generator for generating a first test signal having a predetermined pattern, and a second test signal having a pattern different from the pattern of the first test signal;

a separator for selecting one of the recording signal and the first and second test signals;

recording means for recording the signal selected by the separator on the medium;

reproducing means for reproducing a signal from the medium;

a first comparison circuit for comparing the signal reproduced by the reproducing means with the signal selected by the separator simultaneously with recording by the recording means;

a second comparison circuit for comparing the signal reproduced by the reproducing means with the recording signal after completion of recording by the recording means; and a controller for verifying the signal recorded on the medium by selectively using the first and second comparison circuits, the controller selecting one of the first and second comparison circuits on the basis of a result obtained by comparing the reproduced signal and the second test signal by the first comparison means simultaneously with overwriting of the second test signal on the medium on which the first test signal has been recorded.

According to still another aspect of the present invention, there is provided a method of recording a recording signal on a magnetooptical recording medium, comprising the steps of:

storing the recording signal in a memory;

scanning the medium with a non-modulated light beam;

applying a magnetic field modulated according to the recording signal onto the medium simultaneously with scanning of the light beam;

reproducing a signal from the light beam reflected by the medium;

extracting high-frequency components of the reproduced signal;

separating signal components corresponding to leading and trailing edges of the recording signal from the extracted high-frequency components;

generating a verifying signal from the separated signal components;

comparing the generated verifying signal with the recording signal stored in the memory; and determining based on a comparison result whether or not recording is normally performed.

There is also provided a magnetooptical recording apparatus for executing the above-mentioned recording method, comprising:

a memory for storing a recording signal;

an optical head for scanning a magnetooptical recording medium with a non-modulated light beam;

a magnetic head for applying a magnetic field modulated according to the recording signal on the medium;

a photodetector for receiving the light beam reflected by the medium, and reproducing a signal;

an extraction circuit for extracting high-frequency components of the signal reproduced by the photodetector;

a separation circuit for separating signal components corresponding to leading and trailing edges of the recording signal from the high-frequency components extracted by the extraction circuit;

a generation circuit for generating a verifying signal from the separated signal components;

a comparison circuit for comparing the verifying signal generated by the generation circuit with the recording signal stored in the memory; and a determining circuit for determining based on a comparison result from the comparison circuit whether or not recording is normally performed.

BRIEF DESCRIPTION OF THE DRAWINGS

FIGS. 3A to 3E are timing charts showing signal waveforms of the respective circuits in the first embodiment;

FIGS. 4A to 4B are block diagram showing an information recording apparatus according to the second embodiment of the present invention;

FIGS. 12A to 12E are timing charts showing signal waveforms of the respective circuits in the third embodiment;

FIGS. 13A to 13D and FIGS. 14A to 14D are timing charts showing signal waveforms of the respective circuits obtained when a specific signal is overwritten in the second embodiment;

FIGS. 17A to 17N are timing charts showing signal waveforms of the respective circuits in the fourth embodiment;

DETAILED DESCRIPTION OF THE PREFERRED EMBODIMENTS

Figure 1:
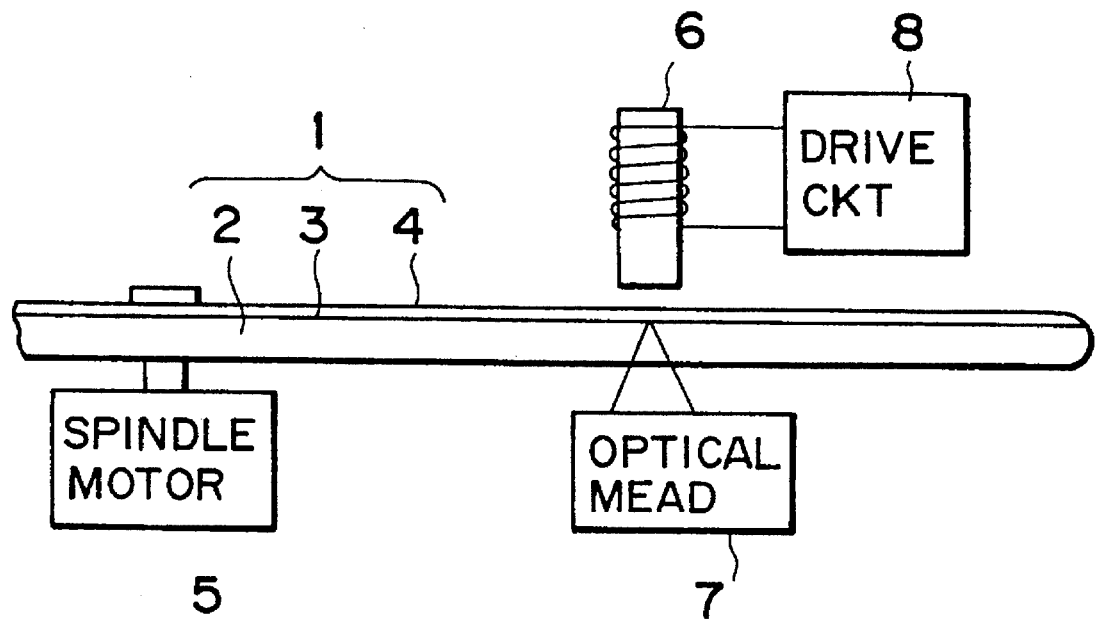
FIG. 1 is a schematic view showing an arrangement of a conventional information recording apparatus.

The preferred embodiments of the present invention will be described in detail hereinafter with reference to the accompanying drawings. FIG. 2 is a block diagram showing an information recording apparatus according to the first embodiment of the present invention. The same reference numerals in FIG. 2 denote parts having the same functions as those in the conventional apparatus shown in FIG. 1, and a detailed description thereof will be omitted in this embodiment. A magnetooptical disk 1 used in this embodiment comprises a recording layer having a two-layered structure including a first magnetic layer having a low coercive force at room temperature, and a high Curie temperature, and a second magnetic layer, which is exchange-coupled to the first magnetic layer, and has a higher coercive force and a lower Curie temperature than those of the first magnetic layer. Referring to FIG. 2, an amplifier 9 amplifies a reproduction signal reproduced as a magnetooptical signal by an optical head 7 to a predetermined level, and a filter 10 extracts specific high-frequency components from the output signal from the amplifier 9. The filter 10 detects frequency components corresponding to the leading and trailing edges of a reproduction signal upon switching of a modulation magnetic field of a magnetic head 6, and this will be described in detail later. A comparator 11 compares the output signal from the filter 10 with predetermined positive and negative reference voltages to binarize the output signal from the filter 10, and a signal generating circuit 14 generates a verifying signal from the binary signal output from the comparator 11. A comparison circuit 15 compares the output signal from the signal generating circuit 14 with recording information stored in a memory 12 so as to check if the recording information is normally recorded. A control circuit 13 controls the respective circuits in the apparatus. When the comparison circuit 15 detects a recording error, the control circuit 13 also performs control for re-recording information at the same position or at another position.

The operation of this embodiment will be described below with reference to the timing charts shown in FIGS. 3A to 3E. When information is recorded, an information signal to be recorded is supplied from the memory 12 to a drive circuit 8 and the comparison circuit 15. FIG. 3A shows a recording signal output from the memory 12. A laser beam emitted from a semiconductor laser arranged in the optical head 7 is radiated onto the magnetooptical disk 1 to form a beam spot. The magnetooptical disk 1 begins to rotate upon driving of a spindle motor 5. At this time, the beam spot is subjected to focus control and tracking control by a servo control circuit (not shown), and begins to scan to follow an information track. The drive circuit 8, which received the recording signal, drives the magnetic head 6 on the basis of the recording signal, and the magnetic head 6 generates a magnetic field modulated according to the recording signal (i.e., a magnetic field whose polarity is reversed according to the recording signal) by this driving operation. The magnetic field is applied to the beam spot radiation portion on the magnetooptical disk 1, and information is sequentially recorded on the information track by an interaction between light and magnetism, as described above.

On the other hand, a non-modulated recording laser beam radiated onto the magnetooptical disk 1 is reflected by the disk surface, and is detected by a photodetector in the optical head 7. At this time, a signal detected by the photodetector is converted into an electrical signal by a photoelectric conversion circuit (not shown), and is reproduced as a magnetooptical signal. More specifically, information, which is being currently recorded, is reproduced simultaneously with recording. The obtained reproduction signal is amplified by the amplifier 9, and is then sequentially supplied to the filter 10. FIG. 3B shows the reproduction signal reproduced as described above. In FIG. 3B, a solid curve $S_1$ represents the reproduction signal extracted as the magnetooptical signal, as described above. A dotted curve $S_2$ represents an old information component immediately before being erased, and a dotted curve $S_3$ represents a magnetooptical component reflecting the magnetization state on a magnetic recording layer 3. The reproduction signal $S_1$ is extracted in a state wherein the components $S_2$ and $S_3$ are synthesized. Note that FIG. 3B separately illustrates the magnetooptical component and the old information component for the sake of convenience. However, it is difficult to separate the components $S_2$ and $S_3$ in practice.

The filter 10 extracts predetermined frequency components from the input reproduction signal, and outputs them to the comparator 11. FIG. 3C shows the output signal from the filter 10. The reproduction signal $S_1$ includes high-frequency components generated upon high-speed switching of the magnetic field to be applied from the magnetic head 6 at level change times ($t_1$ to $t_6$, leading and trailing edges) of the recording signal shown in FIG. 3A. For this reason, the signal extracted by the filter 10 includes steep pulse-shaped signal components corresponding to changes in magnetic field in correspondence with the trailing and leading edges of the recording signal, as shown in FIG. 3C. However, when the direction of magnetization on the magnetic recording layer 3 does not follow the applied magnetic field due to defects on the magnetooptical disk 1, or when the direction of magnetization is not normally changed due to other causes, such steep signal components cannot be extracted. FIGS. 3A to 3E show the signal waveforms under an assumption that recording errors occurred at times $t_2$ and $t_3$ due to the above-mentioned causes. Therefore, as shown in FIG. 3C, no steep signal components appear at times $t_2$ and $t_3$.

In general, in an apparatus of this type for recording/reproducing an information signal using a laser beam, since the signal is reproduced by scanning a magnetization pattern recorded on a disk with a beam spot, having a finite spot size, of the laser beam, the apparatus has a spatial resolution determined by the beam spot size upon reproduction of the signal. For this reason, the reproduction signal includes almost no signal components beyond the cutoff frequency based on the spatial resolution. The same applies to the old information component $S_2$ mixed in the reproduction signal $S_1$. However, the signal component $S_3$ as a change in magnetization generated under the beam spot of the laser beam upon recording of an information signal does not comply with the above-mentioned principle. More specifically, since the temporal change of the signal component $S_3$ is not brought about by scanning the magnetization pattern with the beam spot, but directly reflects the change in magnetic field of the magnetic head 6, the signal component $S_3$ is never influenced by the cutoff frequency based on the spatial resolution. Therefore, since the reversal speed of the magnetic field of the magnetic head 6 is set to be a sufficiently high speed for the purpose of assuring signal quality, a signal component having a high-speed temporal change corresponding to a change in level of an information signal to be recorded appears in the reproduction signal $S_1$ including the signal component $S_3$, which is being currently recorded. According to the above-mentioned principle, high-frequency components corresponding to changes in information signal can be extracted as the output from the filter 10.

The comparator 11 binarizes the output signal from the filter 10 using positive and negative reference voltages $h_+$ and $h_-$ shown in FIG. 3C. Thus, the comparator 11 outputs binary signals $f_1$ and $f_2$ corresponding to a change in level of the recording signal, as shown in FIG. 3D. Of course, at times $t_2$ and $t_3$, since the errors occurred, as described above, no binary signals are output. The signal generating circuit 14 generates a verifying signal shown in FIG. 3E using the input binary signals $f_1$ and $f_2$. More specifically, the signal generating circuit 14 generates a signal, which goes to high level during an interval between the leading edge of the binary signal $f_1$ and the trailing edge of the signal $f_2$, and outputs this signal as the verifying signal to the comparison circuit 15. The comparison circuit 15 sequentially compares the recording signal sent from the memory 12 and the verifying signal from the signal generating circuit 14, and detects if the two data coincide with each other. The detection result of the comparison circuit 15 is supplied to the control circuit 13. When the detection result indicates a non-coincidence, the control circuit 13 determines a recording error, and performs processing for re-recording information at the same recording position on the magnetooptical disk 1 or at another alternative position. In the case shown in FIGS. 3A to 3E, since the errors occurred at times $t_2$ and $t_3$, the comparison circuit 15 detects non-coincidences at these portions, and the control circuit 13 determines recording errors. In this manner, according to this embodiment, information, which is being currently recorded, is reproduced from reflected light of a recording light beam simultaneously with recording, frequency components corresponding to the leading and trailing edges of a recording signal are extracted from the obtained reproduction signal, and a verifying signal is generated from the frequency components. For this reason, even when the reproduction signal includes an old information component, recording information can be faithfully reproduced regardless of the old information component, and a verifying signal with high reliability can be generated. Therefore, the influence of a crosstalk of the old information component as the problem of the conventional one-beam direct verification method can be effectively eliminated, and verification cad be performed with high reliability.

Note that this embodiment exemplifies a filter as a means for extracting frequency components corresponding to the leading and trailing edges of a recording signal from a reproduction signal. However, the present invention is not limited to this. For example, a differential circuit, or any other circuits having equivalent functions may be used. In this embodiment, the leading and trailing edge portions of an information pit are detected by extracting frequency components corresponding to the leading and trailing edges of recording information. When a disk defect is present, the defect region is sufficiently wider than the information pit, and all kinds of recording errors can be detected, as a matter of course.

FIG. 4 is a block diagram showing the second embodiment of the present invention. In this embodiment, two filters having different frequency bands are arranged, and are switched between a recording mode and a normal reproduction mode. More specifically, in the recording mode, high-frequency components are extracted from a reproduction signal to perform verification like in the first embodiment, and in the normal reproduction mode, low-frequency components are extracted to reproduce data. Referring to FIG. 4, a semiconductor laser 21 is arranged as a light source for recording and reproduction. A collimator lens 22 collimates a convergent beam emitted from the laser 21. A half prism 23 separates an incident laser beam from the semiconductor laser 21 and light reflected by a recording medium 25. An objective lens 24 focuses the laser beam from the semiconductor laser 21 to form a small beam spot on the recording medium 25. As the recording medium 25, a disk-shaped magnetooptical recording medium, which is rotated upon driving of a spindle motor (not shown), is used. The recording medium 25 has a two-layered magnetic layer including first and second magnetic layers 25a and 25b, which are exchange-coupled to each other. The first magnetic layer 25a has a low coercive force at room temperature, anti a high Curie temperature, and the second magnetic layer 25b has a higher coercive force and a lower Curie temperature than those of the first magnetic layer 25a. A magnetic head 26 is arranged to oppose the objective lens 24 to sandwich the recording medium 25 therebetween. The magnetic head 26 generates a magnetic field modulated according to a recording signal, and applies the magnetic field to the recording medium 25.

Figure 5:
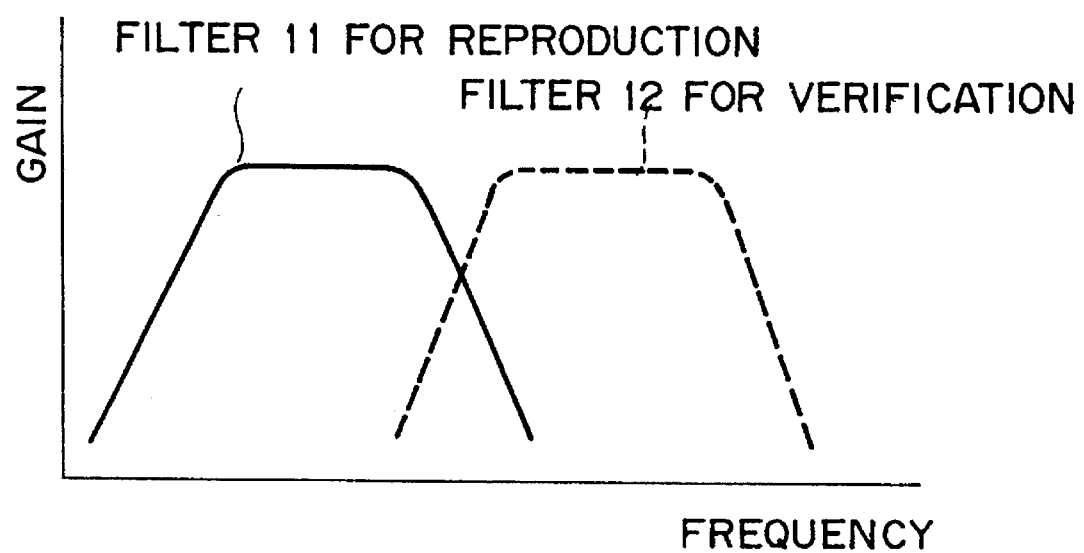
FIG. 5 is a graph showing filter characteristics in the second embodiment.

A polarization beam splitter 27 splits light reflected by the recording medium 25 into two beams. The two beams are respectively detected by photosensors 28 and 29. A differential amplifier 30 calculates a difference between the detection signals output from the photosensors 28 and 29 to reproduce recording information as a magnetooptical signal. The information reproduction is performed simultaneously with information recording on the basis of light reflected by the recording medium 25. A filter 31 for reproduction is used in the normal information reproduction mode. A filter 32 for verification is used for extracting a verifying signal in the information recording mode. These two filters are switched by a switch 20 according to the operation mode of the apparatus. FIG. 5 shows the characteristics of the filters 31 and 32. The frequency band of the filter 32 is selected to be able to extract signal components in a higher frequency band than that of the filter 31. More specifically, the frequency band of the filter is selected to generate a verifying signal by extracting only high-frequency components corresponding to the leading and trailing edges of a reproduction signal in the information recording mode.

A binarizing circuit 33 binarizes a signal input through the selected filter. A data separator 34 is used in the normal information reproduction mode, and synchronizes the binary signal output from the binarizing circuit 33. A decoder 35 decodes the synchronized data to generate reproduction data. An encoder 36 encodes recording data to generate a recording signal. A magnetic field applying circuit 37 drives the magnetic head 26 according to the recording signal. The magnetic field applying circuit 37 controls current flowing through a magnetic field generation coil arranged in the magnetic head 26, thereby modulating the polarity of the magnetic field in correspondence with the recording signal. A delay circuit 38 delays the recording signal output from the encoder 36 by a time required until information is recorded on and reproduced from the recording medium 25, and is binarized by the binarizing circuit 33, so as to cause the timing of the recording signal to coincide with that of the binary signal. A comparison circuit 39 compares the recording signal and the verifying signal output from the binarizing circuit 33 in the information recording mode. A verification determining circuit 40 determines based on the comparison result of the comparison circuit 39 whether or not information is normally recorded.

The operation of this embodiment will be described below with reference to the timing charts shown in FIGS. 6A to 6H. When information is recorded, the semiconductor laser 21 radiates a recording laser beam having a constant intensity, which is set at a predetermined recording power. The recording laser beam becomes incident on the objective lens 24 via the collimator lens 22 and the half prism 23, and the laser beam focused to a small beam spot by the objective lens 24 is radiated onto the information track of the recording medium 25. In this case, the recording medium 25 begins to rotate at a constant speed upon driving of the spindle motor (not shown), and the beam spot is subjected to focus control and tracking control under the control of a focus control circuit and a tracking control circuit (neither are shown). Thus, the beam spot begins to scan to follow the information track while being focused on the medium surface. In the information recording mode, the switch 20 is connected to the contact b side. In this manner, when the recording laser beam having the constant intensity is radiated onto the recording medium 25, the temperature of the region, irradiated with the recording laser beam, of the recording medium is increased, and the magnetization of the second magnetic layer 25b having a lower Curie temperature disappears. Note that the beam intensity of the recording laser beam is set to be high enough to heat the second magnetic layer 25b to a temperature near its Curie temperature in consideration of the rotational speed of the recording medium 25. At this time, even though the magnetization of the second magnetic layer 25b disappears, since the first magnetic layer 25a has a higher Curie temperature, its magnetization remains. When the magnetization of the second magnetic layer 25b disappears, no exchange coupling force acts between the first and second magnetic layers 25a and 25b, and the first magnetic layer 25a has the original low coercive force. When the exchange coupling force acts, the coercive force of the first magnetic layer 25a is apparently increased.

Figure 6:
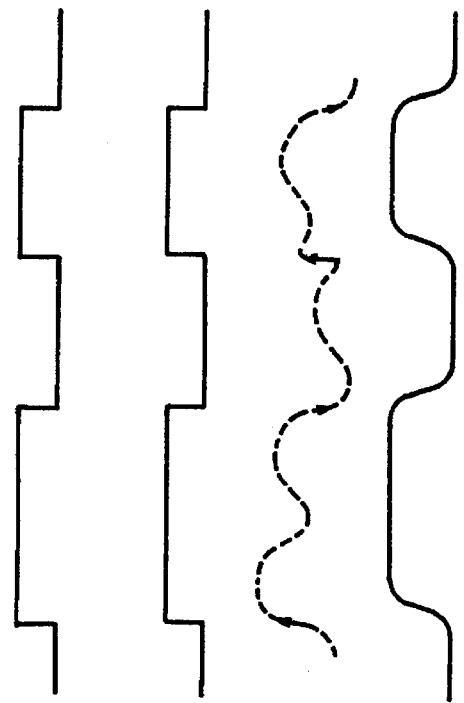
FIGS. 6A to 6H are timing charts showing signal waveforms of the respective circuits in the second embodiment.

In a state wherein the recording laser beam is radiated onto the recording medium 25, the magnetic head 26 applies an external magnetic field, whose direction is modulated according to the recording signal, onto the heated portion of the recording medium 25. FIG. 6A shows the recording signal. Upon application of the external magnetic field, the direction of magnetization of the first magnetic layer 25a is oriented in the direction of the external magnetic field, thereby recording information. The direction of magnetization of the first magnetic layer 25a is detected in real time by the photosensors 28 and 29 as a change in magnetooptical effect (Kerr effect or Faraday effect) of the recording laser beam radiated on and reflected by the recording medium 25. More specifically, the recording laser beam radiated on the position applied with the magnetic field from the magnetic head 26 is reflected by the recording medium 25, and is incident on the photosensors 28 and 29 via the objective lens 24, the half prism 23, and the polarizing beam splitter 27. The outputs from the photosensors 28 and 29 are input to the differential amplifier 30, and are differentially amplified, thereby extracting a reproduction signal of information, which is being currently recorded. FIG. 6C shows the reproduction signal. Since information is overwritten on old data on the recording medium 25, the reproduction signal includes both the old data and new recording data, as shown in FIG. 6C.

Figure 7:
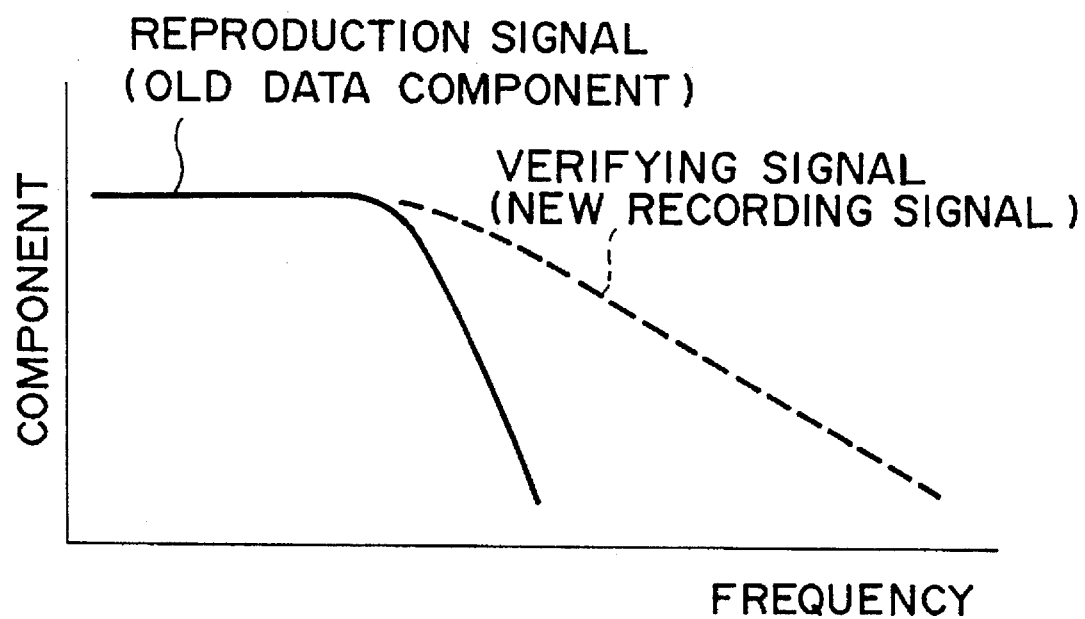
FIG. 7 is a graph showing the frequency band of a verifying signal in a reproduction signal.

The reproduction signal obtained in this manner is input to the verifying filter 32, and only a signal in the pre-set frequency band is extracted by the filter 32. The reproduction signal obtained by the differential amplifier 30 includes a new recording signal component, and an old data component originally recorded on the recording medium 25, and to be deleted by overwriting. These two signal components have different frequency components, as shown in FIG. 7. Since the new recording component includes high-frequency components based on magnetic field modulation since it instantaneously changes according to reversal of the magnetic field. On the other hand, the high-frequency components of the old data component are limited by the shapes of the beam spot and recording pit or a relative speed therebetween. Thus, the filter 32 cuts off the old data component in the reproduction signal, and extracts high-frequency components as edge components of the new recording signal. FIG. 6E shows a signal extracted by the filter 32. The output signal from the filter 32 is supplied to the binarizing circuit 83, and is binarized to a pulse signal shown in FIG. 6F. The binary signal is supplied to the comparison circuit 39, and is compared with the recording signal, which is delayed by the delay circuit 38, so that its timing coincides with that of the binary signal. The comparison result from the comparison circuit 89 is output to the verification determining circuit 40, and whether or not information is normally recorded is determined based on the comparison result. In this case, upon comparison between the recording information and the reproduction signal, if the reproduction signal does not coincide with the recording information, an error is determined, and a series of recording information is re-recorded at the same or anon;her position on the recording medium. Of course, if the reproduction signal coincides with the recording information, no re-recording is performed. Note that the re-recording may be performed either after a series of information is recorded or immediately after it is detected that the reproduction signal does not coincide with the recording information. In this manner, when recording cannot be normally performed due to defects, deterioration, or corrosion of the recording medium, dust, malfunctions of the magnetooptical recording apparatus, or the like, since an abnormal reproduction signal is generated, whether or not information is normally recorded can be checked. When information is reproduced after deletion of old data on the recording medium, a signal waveform approximate to a rectangular wave is obtained since no old data component is included, as shown in FIG. 6B.

In the normal information reproduction mode, the switch 20 is switched to the contact a side to select the filter 31 for reproduction. In this state, the semiconductor laser 21 radiates a reproduction laser beam having a reproduction power lower than the recording/verification power onto the rotating recording medium, and information on the information track is sequentially output from the differential amplifier 30. FIG. 6D shows the reproduction signal in the normal reproduction mode. The obtained reproduction signal is input to the filter 31, and high-frequency noise is removed from the reproduction signal, as shown in FIG. 6G. Thereafter, the binarizing circuit 33 converts the edge portions of the reproduction signal into pulses, thereby obtaining a signal suitable for reproduction, as shown in FIG. 6H. This signal is synchronized by the data separator 34, and is decoded by the decoder 35, thereby generating reproduction data.

Figure 8:
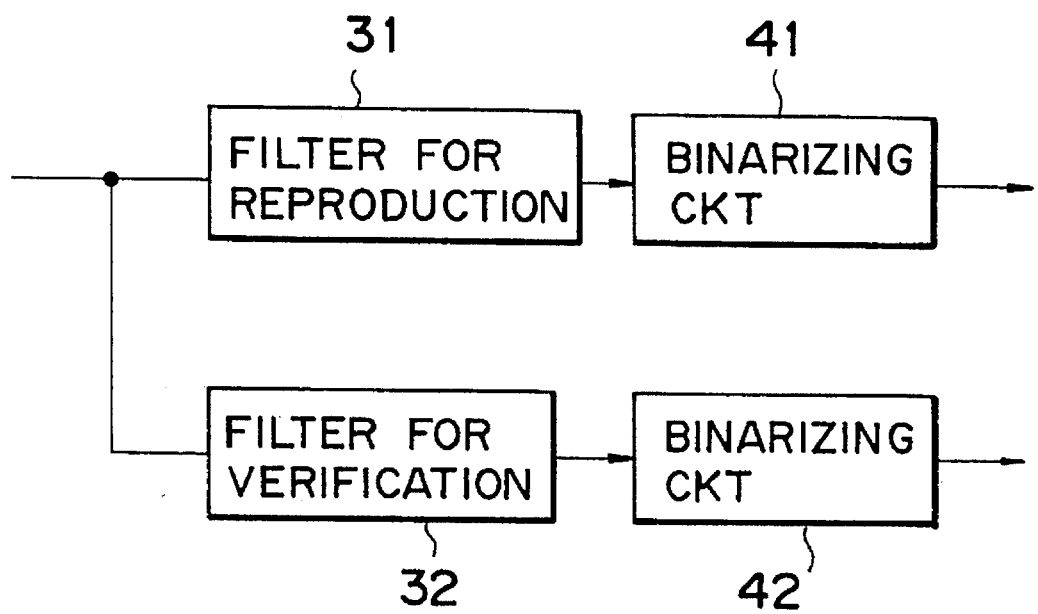
FIGS. 8 and 9 are block diagrams showing modifications of peripheral circuits of a filter in the second embodiment.
Figure 9:
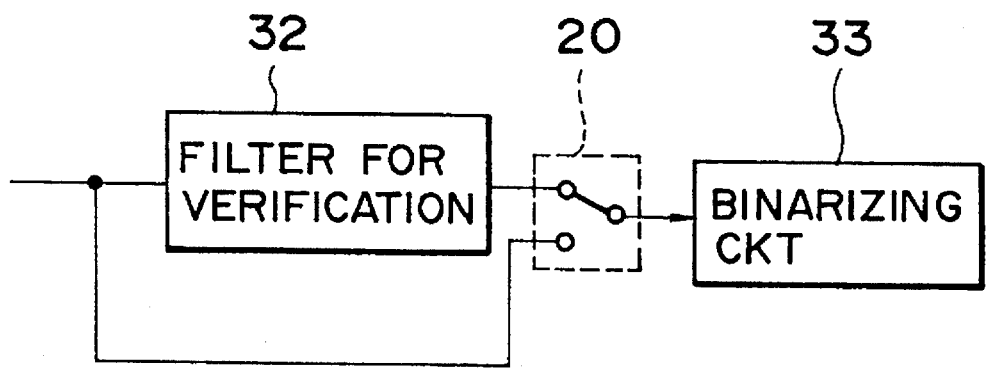

In this embodiment, a common binarizing circuit is used. However, as shown in FIG. 8, two binarizing circuits 41 and 42 may be separately arranged in correspondence with the filter 31 for reproduction and the filter 32 for verification. Alternatively, as shown in FIG. 9, a circuit before the binarizing circuit may be switched by the switch 20, so that a signal is input to the binarizing circuit via the filter for verification in the recording mode, and is input to the binarizing circuit without going through the filter in the normal reproduction mode. Furthermore, the constants of a single filter may be switched between the recording mode and the normal reproduction mode. Moreover, two differential amplifiers may be arranged in correspondence with the recording mode and the normal reproduction mode.

Figure 10:
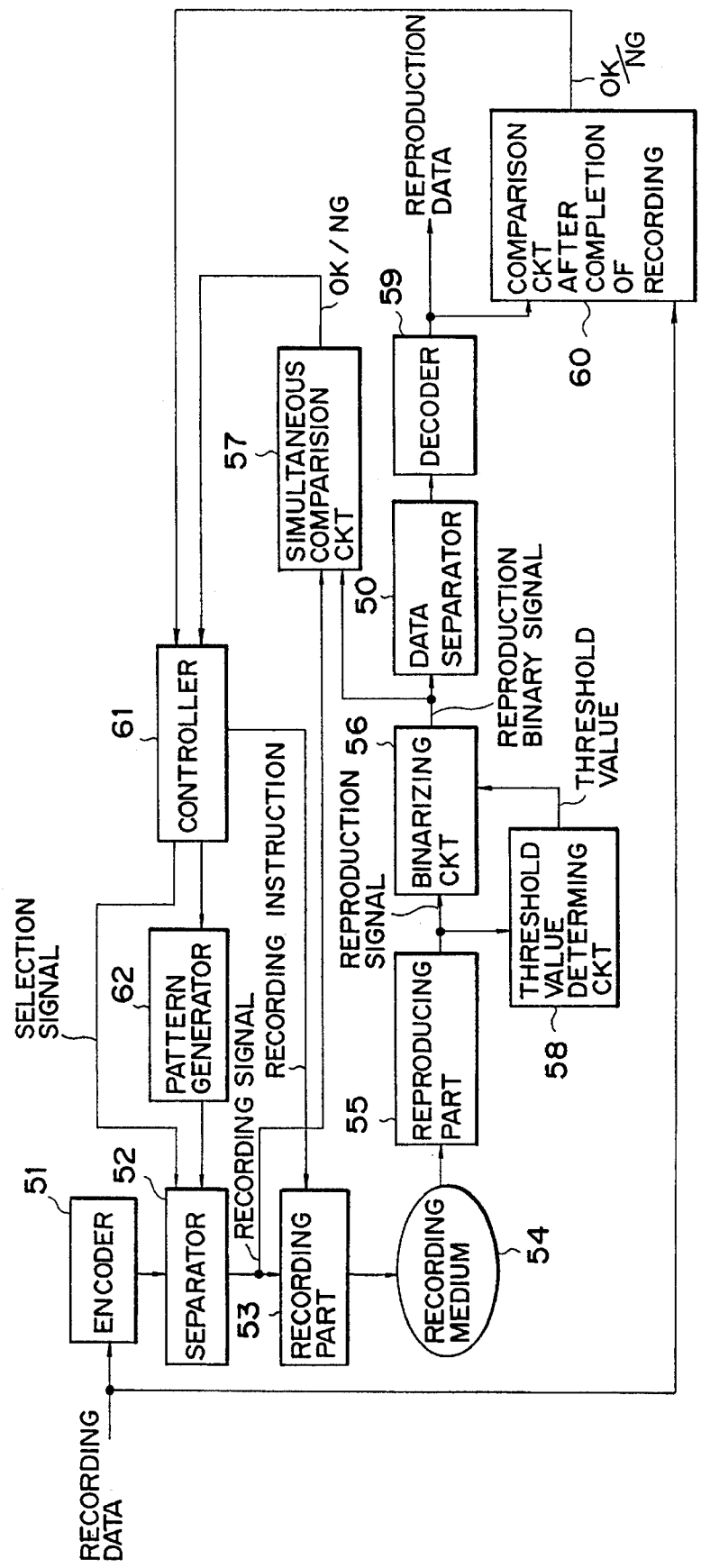
FIG. 10 is a block diagram showing an information recording apparatus according to the third embodiment of the present invention.

FIG. 10 is a block diagram showing the third embodiment of the present invention. In FIG. 10, an encoder 51 encodes recording data by (2, 7) NRZI (Non Return to Zero Inverted) coding popularly used for magnetic disks and optical disks in this embodiment. The shortest signal inversion interval of the (2, 7) NRZI code is 3T, and the longest signal inversion interval is 8T (where T is the encoding clock period). A separator 52 selects and outputs one of the encoded signal and a predetermined pattern signal output from a pattern generator 62 (to be described later) according to an instruction from a controller. A recording part 53 records the signal selected by the separator 52 on a recording medium 54. As the recording medium, a magnetooptical disk is used like in the above embodiments. A reproducing part 55 reproduces information recorded on the recording medium 54 simultaneously with recording. A binarizing circuit 56 binarizes a reproduction signal output from the reproducing part 55. A simultaneous comparison circuit 57 simultaneously compares the reproduction binary signal and the recording signal output from the separator 52 to perform verification. A threshold value determining circuit 58 determines a threshold value upon binarizing of the reproduction signal in the binarizing circuit 56. The simultaneous comparison circuit 57 is used for performing verification simultaneously with recording in a normal recording mode.

A data separator 50 accesses the reproduction binary signal output from the binarizing circuit 56, and generates a sync clock and sync data synchronized with the sync clock. A decoder 59 decodes the (2, 7) code to original data on the basis of the sync clock and the sync data, thereby generating reproduction data. A comparison circuit 60 compares the reproduction data output from the decoder 59 with the recording data to perform verification. The comparison circuit 60 verifies recorded information after completion of recording unlike in the simultaneous comparison circuit 57, which performs verification simultaneously with recording. A controller 61 systematically controls the apparatus. For example, the controller 61 controls trial recording, and determines based on the comparison result from the simultaneous comparison circuit 57 whether verification is performed simultaneously with recording or after completion of recording. The pattern generator 62 generates different pattern signals according to an instruction from the controller 61 in a trial recording mode. In this embodiment, the pattern generator 62 generates a 3T pattern signal as the shortest period pattern, and a 6T pattern signal having a period twice that of the 3T pattern signal.

The operation of this embodiment will be described below with reference to the flow chart shown in FIG. 11 and the timing charts shown in FIGS. 12A to 12E. The controller 61 instructs the recording part 53 to perform trial recording when the apparatus is started up, or when the medium is exchanged, or when the apparatus is in a waiting state without executing recording or reproduction (these states will be referred to as a recording preparation mode hereinafter; S1 in FIG. 11). At this time, the controller 61 instructs the pattern generator 62 to generate a 6T pattern signal, and instructs the separator 52 to select the signal output from the pattern generator 62. Thus, the 6T pattern signal is selected and output to the recording part 53, and the recording part 53 performs trial recording of the 6T pattern on a predetermined region of the recording medium 54 (S2). FIG. 12A shows the 6T pattern signal. The controller 61 then controls the pattern generator 62, the separator 52, and the recording part 53 to overwrite a 3T pattern on the 6T pattern, and also controls the reproducing part 55 to reproduce the 3T pattern simultaneously with recording. Thus, the 3T pattern signal is newly recorded on the 6T pattern on the recording medium 54, and information on the medium is simultaneously reproduced (S3). FIG. 12B shows the overwritten 3T pattern signal, and FIG. 12D shows a reproduction signal reproduced simultaneously with recording. In a normal reproduction mode, a reproduction signal shown in FIG. 12C is obtained. However, in this case, since reproduction is performed simultaneously with recording, a signal including both the 6T pattern as old data and the 3T pattern as new data is obtained, as shown in FIG. 12D. More specifically, the reproduction signal has a signal waveform obtained by adding a reproduction signal of the 6T pattern as the old data to a signal component having a steeper inclination than the signal in the normal reproduction mode under the influence of the 3T pattern signal. This reproduction signal is binarized to a pulse signal shown in FIG. 12E by the binarizing circuit 56.

The threshold value determining circuit 58 determines the threshold value of the binarizing circuit 56, so that the duty of the binary signal at that time is 50%. FIG. 12E Shows the signal binarized in this manner. The binary signal is compared with the recording signal supplied from the separator 52 by the simultaneous comparison circuit 57, thereby checking if the 3T pattern signal is correctly reproduced (S4). More specifically, verification is performed by comparing the signals shown in FIGS. 12B and 12E. At this time, if the two signals coincide with each other, the simultaneous comparison circuit 57 outputs a signal indicating that recording verification is OK; if the two signals do not coincide with each other, the circuit 57 outputs an error signal. If the recording verification is OK, the controller 61 determines that verification is not influenced by old data included in the reproduction signal, and controls operation to perform verification simultaneously with recording using the simultaneous comparison circuit 57 in the subsequent normal recording mode (S5). If the error signal is output, the controller 61 determines that it is difficult to perform verification simultaneously with recording under the influence of old data, and controls operation to verify recorded Information reproduced after completion of recording using the comparison circuit 60 in the subsequent normal recording mode (S6). Note that the threshold value of the binarizing circuit 56 in the simultaneous recording verification mode adopts that determined in the recording preparation mode. When an error is detected in either verification simultaneously with recording or after completion of recording in the normal recording mode, the controller 61 controls operations to perform, e.g., re-recording.

In this embodiment, the threshold value of the binarizing circuit is optimized upon execution of trial recording. However, the present invention is not limited to this. For example, in a magnetooptical recording apparatus, the light amount of a semiconductor laser as a light source or the strength of a magnetic field may be optimized. In this embodiment, the number of old data components included in a signal reproduced simultaneously with recording can be detected. By utilizing this feature, recording media having different characteristics may be selected according to the number of old data components. Furthermore, when a multivalue signal is used as the reproduction signal in place of the binary signal, a plurality of threshold values may be obtained in such a manner that a plurality of predetermined duties are obtained in the trial recording mode. More specifically, the binarizing circuit 56 may be replaced with, e.g., a quaternary-conversion circuit. In this case, four threshold values need only be obtained.

In this embodiment, trial recording is performed in the recording preparation mode of the apparatus so as to check the influence of old data components on a verifying signal, and whether simultaneous recording verification or recording verification after completion of recording is performed is determined according to the checking result. For this reason, an optimal recording verification mode can be selected according to old data components on the medium. Therefore, when the number of old data components is large, the recording verification after completion of recording is automatically selected in place of the simultaneous recording verification, thereby perfectly eliminating the influence of the old data components, and improving reliability of verification. In some recording media, simultaneous recording verification cannot be performed due to too many old data components. In this case, since verification after completion of recording is automatically selected, medium compatibility can be effectively improved.

An embodiment which further improves the second embodiment described with reference to FIG. 4 will be described below.

FIGS. 13A to 13D and FIGS. 14A to 14D are timing charts showing signal waveforms of the respective circuits obtained when a specific signal is overwritten in the second embodiment. FIGS. 13A to 13D show the signal waveforms obtained when overwriting is performed under a condition that the ratio of recording frequencies of old information to new information is 4:5. FIGS. 14A to 14D show the signal waveforms obtained when overwriting is performed under a different condition that the ratio of recording frequencies of old information to new information is 5:4. Each of FIGS. 13A and 14A shows an old information signal component recorded on the recording medium, and each of FIGS. 13B and 14B shows a recording signal of new information overwritten on the old information. As shown in FIGS. 13A and 14A, the old information signal component does not include steep high-frequency components. Each of FIGS. 13C and 14C shows a reproduction signal differentially detected by the differential amplifier 30 shown in FIG. 4. The reproduction signal has a signal waveform obtained by adding the old and new information components at a predetermined ratio. Furthermore, each of FIGS. 13D and 14D shows a signal obtained by the filter 32 for verification shown in FIG. 4. In this case, components S corresponding to the edges of the recording signal are mainly extracted. However, since new information is overwritten on old information, components P, Q, and R generated under the influence of a crosstalk of the old information component are slightly included in the signal shown in FIG. 13D or 14D in addition to the components S. The reproduction signal for verification obtained in this manner is binarized by the binarizing circuit 33 shown in FIG. 4. In this case, the components S shown in FIG. 13D or 14D are converted into the edges of binary pulses, thus generating signal components corresponding to the edges of the recording signal. Then, recording verification can be performed in real time by comparing the binary signal components and the edges of the recording signal. When the high-frequency bands of the photosensors 28 and 29 and the differential amplifier 30 shown in FIG. 4 are sufficiently high, the peak level of the signal component S can be set to be sufficiently higher than those of other signal components P, Q, and R by setting a high cutoff frequency of the filter 32 for verification, and recording verification can be normally performed. However, when the frequency bands of the photosensors 28 and 29 and the differential amplifier 30 are limited, the cutoff frequency of the filter 32 must be decreased. For this reason, as shown in FIGS. 13A to 13D and FIGS. 14A to 14D, a difference between the components S corresponding to the edges of the recording signal and other components P, Q, and R becomes uncertain. When the reproduction signal is binarized in this state, the components P, Q, and R may be binarized in addition to the components S. Therefore, although information is normally recorded, a recording error may be determined, and wrong verification may be performed.

Figure 15:
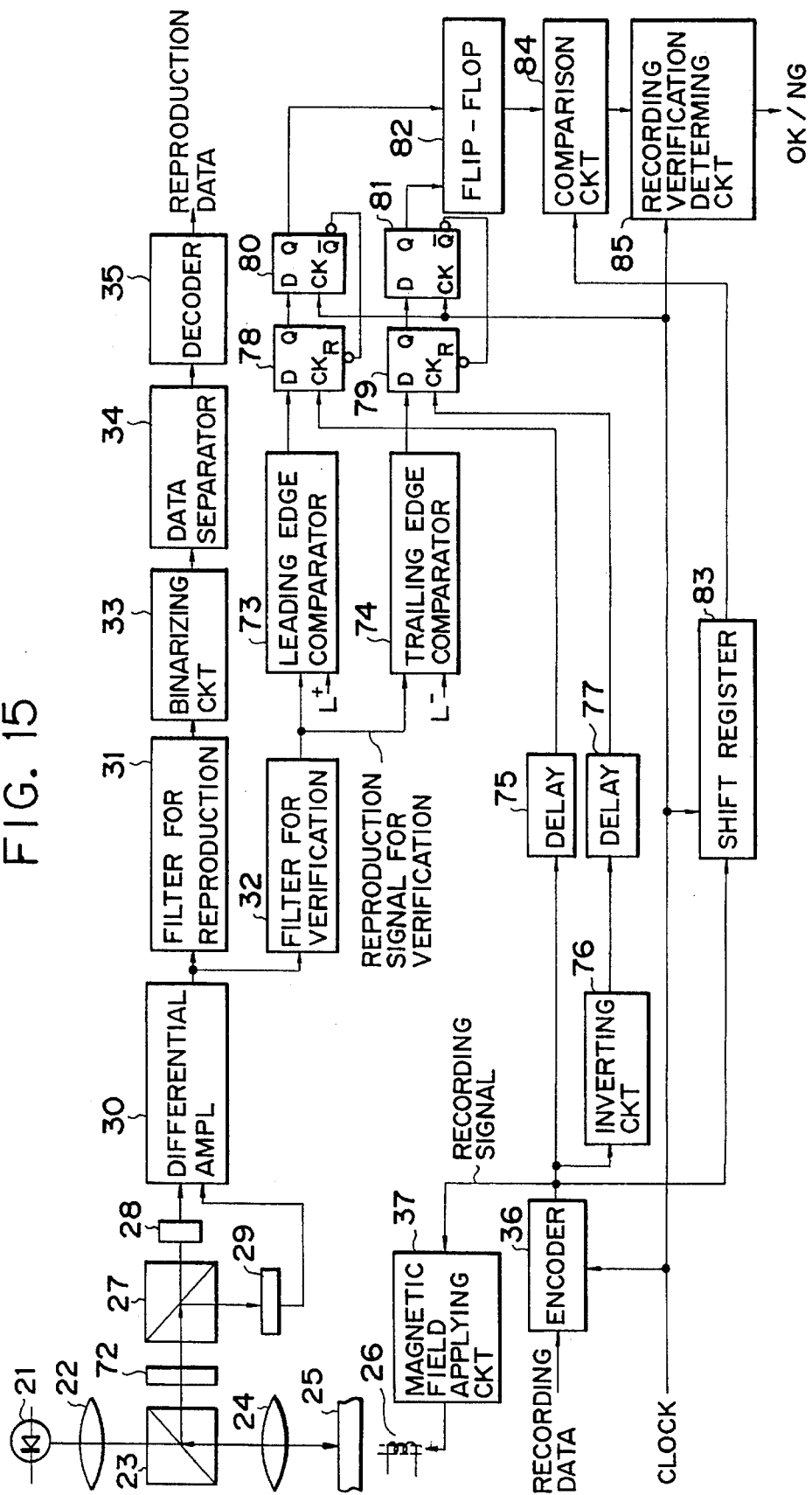
FIG. 15 is a block diagram showing an information recording apparatus according to the fourth embodiment of the present invention.
Figure 16:
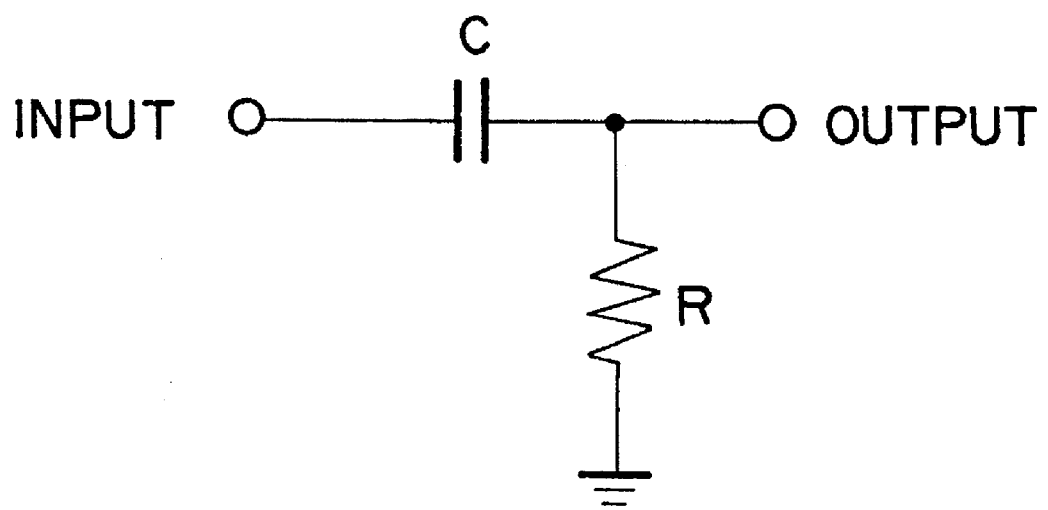
FIG. 16 is a circuit diagram showing an arrangement of a filter used in the fourth embodiment.

FIG. 15 is a block diagram showing an arrangement according to the fourth embodiment of the present invention, which can solve the above-mentioned problem. The same reference numerals in FIG. 15 denote the same parts as in the information recording apparatus of the second embodiment shown in FIG. 4, and a detailed description thereof will be omitted in this embodiment. In FIG. 15, a leading edge comparator 73 compares a reproduction signal for verification output from a filter 32 for verification with a predetermined slice level $L^+$ to binarize the reproduction signal for verification, thereby detecting the leading edge of a recording signal. A trailing edge comparator 74 compares the reproduction signal for verification with a predetermined slice level $L^-$ to binarize the reproduction signal for verification, thereby detecting the trailing edge of the recording signal in this embodiment, the filter 32 adopts a high-frequency differential circuit constituted by a resistor R and a capacitor C, as shown in FIG. 16. D-flip-flop circuits 78 and 79 are respectively used as latches, and serve as circuits for respectively extracting only output signal components after an elapse of a predetermined period of time from the leading and trailing edges of the recording signal from the output signals from the comparators 73 and 74, and cutting other signal components. Flip-flop circuits 80 and 81 synchronize the latch outputs with a clock signal. A flip-flop circuit 82 synthesizes the output signals from the flip-flop circuits 80 and 81 to generate a reproduction signal corresponding to the original recording signal. A delay 75 delays the recording signal output from an encoder 36. More specifically, the delay 75 delays the recording signal by a time corresponding to a delay time from the encoder 36 to the comparator 73, and outputs the delayed recording signal to the CK terminal of the flip-flop circuit 78. A delay 77 similarly delays the recording signal by the same delay time as described above, and outputs the delayed recording signal to the CK terminal of the flip-flop circuit 79. In this case, the recording signal is inverted by an inverting circuit 76, and the inverted signal is input to the delay 77, The flip-flop circuits 78 and 79 respectively latch the binary signals output from the comparators 73 and 74 in response to the leading edges of the input delayed signals, thereby extracting only the leading and trailing edges of the true recording signal. A shift register 83 delays the recording signal output from the encoder 36 to cause the timing of the recording signal to coincide with that of a signal for recording verification output from the flip-flop circuit 82. A comparison circuit 84 exclusively ORs the recording signal output from the shift register 83 and the signal for recording verification output from the flip-flop circuit 82 to detect a non-coincidence between the two signals. Furthermore, a recording verification determining circuit 85 is mainly constituted by a counter.

The operation of this embodiment will be described in detail below with reference to the timing charts shown in FIGS. 17A to 17N. An operation in an information recording mode will be described first. FIG. 17A shows a recording signal generated by encoding recording data by the encoder 36, The recording signal is output to a magnetic field applying circuit 37 as a magnetic field modulation signal, The magnetic field applying circuit 37 drives a magnetic head 26 on the basis of the recording signal, The magnetic head 26 generates a magnetic field modulated according to the recording signal, and applies the magnetic field to a recording medium 25. On the other hand, a recording laser beam emitted from a semiconductor laser 21 is scanned on the information track of the recording medium 25, and a series of information is recorded on the information track upon radiation of the laser beam and application of the modulated magnetic field. At the same time, the recording laser beam is reflected by the recording surface of the recording medium 25, and the reflected beam is detected by photosensors 28 and 29. The detection signals output from the photosensors 28 and 29 are differentially detected by a differential amplifier 30, thus reproducing a magnetooptical signal. The obtained reproduction signal is supplied to the filter 32 for verification, and only high-frequency components as edge components of the new recording signal are extracted. FIG. 17B shows the reproduction signal for verification obtained in this manner. As can be apparent from FIG. 17B, the reproduction signal for verification is delayed by a time T from the recording signal since it requires a certain time from recording until reproduction. The reproduction signal for verification includes components $P_1$, $Q_1$, and the like generated by, e.g., interference in addition to components $S_1$ and $S_2$ corresponding to the leading edges of the recording signal, and a component $S_3$ corresponding to the trailing edge of the recording signal. The reproduction signal for verification is output to the leading and trailing edge comparators 73 and 74, and is binarized by the positive and negative slice levels $L^+$ and $L^-$ shown in FIG. 17B by the corresponding comparators. FIG. 17C shows a binary signal output from the leading edge comparator 73, and FIG. 17D shows a binary signal output from the trailing edge comparator 74. The binary signals include excessive pulses corresponding to the above-mentioned components $P_1$ and $Q_1$ since their levels are higher than the slice levels $L^+$ and $L^-$. The binary signal output from the comparator 73 is supplied to the D terminal of the flip-flop circuit 78, and the binary signal output from the comparator 74 is supplied to the D terminal of the flip-flop circuit 79.

The recording signal output from the encoder 36 is delayed by the delay 75 by the delay time T of the reproduction signal for verification with respect to the recording signal, as shown in FIG. 17E, and the delayed recording signal is supplied to the CK terminal of the flip-flop circuit 78. The recording signal is inverted by the inverting circuit 76, and is delayed by the time T by the delay 77, as shown in FIG. 17F. Thereafter, the delayed recording signal is supplied to the CK terminal of the flip-flop circuit 79. Thus, the output signal from the Q terminal of the flip-flop circuit 78 goes to high level at the timing of the leading edge of the delayed signal from the delay as shown in FIG. 17H. Similarly, the output signal from the Q terminal of the flip-flop circuit 79 goes to high level at the timing of the leading edge of the delayed signal from the delay 77, as shown in FIG. 17I. These output signals are inverted to low level at the clock period, as shown in FIGS. 17H and 17I, since reset signals are supplied from the Q terminals of the flip-flop circuits 80 and 81 in the next stage to the R terminals of the flip-flop circuits 78 and 79. More specifically, only the pulses $S_1$ to $S_3$ corresponding to the leading and trailing edges of the recording signal shown in FIGS. 17C and 17D are extracted, and the excessive pulses $P_1$ and $Q_1$ are removed. The extracted pulse signals are respectively output to the flip-flop circuits 80 and 81, and are synchronized with clocks (FIG. 17G), as shown in FIGS. 17J and 17K. The output signals from the Q terminals of the flip-flop circuits 80 and 81 are output to the R terminals of the flip-flop circuits 78 and 79 in the previous stage as reset signals, as described above. The synchronized pulse signals are output to the flip-flop circuit 82. The flip-flop circuit 82 synthesizes the synchronized pulse signals from the flip-flop circuits 80 and 81, as shown in FIG. 17L, thereby generating a signal for recording verification. More specifically, the original recording signal is reproduced using the synchronized pulse signals, and is output as the signal for recording verification to the comparison circuit 84.

The comparison circuit 84 receives the recording signal, which is delayed by a predetermined period of time to adjust its timing, from the shift register 83, as shown in FIG. 17M. The comparison circuit 84 compares the signal for recording verification and the recording signal to detect a non-coincidence between the two signals. In FIGS. 17A to 17N, since the edges of the recording signal are normally detected, the comparison circuit 84 outputs a "0" level indicating a coincidence between the two signals, as shown in FIG. 17N. The comparison circuit 84 sequentially compares the signal for recording verification reproduced by extracting high-frequency components of the reproduction signal with the recording signal to detect a non-coincidence therebetween, and the detection signal output from the comparison circuit 84 is supplied to The recording verification determining circuit 85. The determining circuit 85 counts the number of non-coincidences. If a count value within a predetermined period is equal to or smaller than an allowable value, the determining circuit 85 supplies an OK signal indicating that data is normally recorded to a controller (not shown); if the count value exceeds the allowable value, the circuit 85 outputs an NG signal indicating that a recording error occurred to the controller. When a recording error occurs, processing for re-recording data on the same information track or on another alternative information track is performed. On the other hand, when information recorded on the recording medium 25 is to be reproduced, a reproduction laser beam emitted from the semiconductor laser 21 is scanned on the information track of the recording medium 25, and a series of information on the information track is sequentially reproduced as a magnetooptical signal by the differential amplifier 30. High-frequency noise is removed from the obtained reproduction signal by a filter 31 for reproduction, and the reproduction signal is then binarized by a binarizing circuit 33. The binary signal is synchronized by a data separator 34, and is decoded by a decoder 35, thus generating reproduction data.

In this embodiment, information, which is being currently recorded, is reproduced from reflected light of a recording laser beam simultaneously with recording, frequency components corresponding to the leading and trailing edges of the recording signal are extracted from the obtained reproduction signal, and a reproduction signal for verification is generated based on the extracted frequency components. For this reason, even when the reproduction signal includes old information components, recorded information can be faithfully reproduced regardless of these information components, and a reproduction signal for verification can be generated with high reliability. Therefore, the influence of crosstalk of old information components can be effectively eliminated. In addition, since only the components corresponding to the edges of the recording signal are extracted from the reproduction signal for verification, and other components generated by, e.g., interference are completely removed, a signal for recording verification, which faithfully reproduces the recording signal, can be obtained without being influenced by the excessive components. As described above, the reliability of one-beam direct verification can be remarkably improved.

Figure 18:
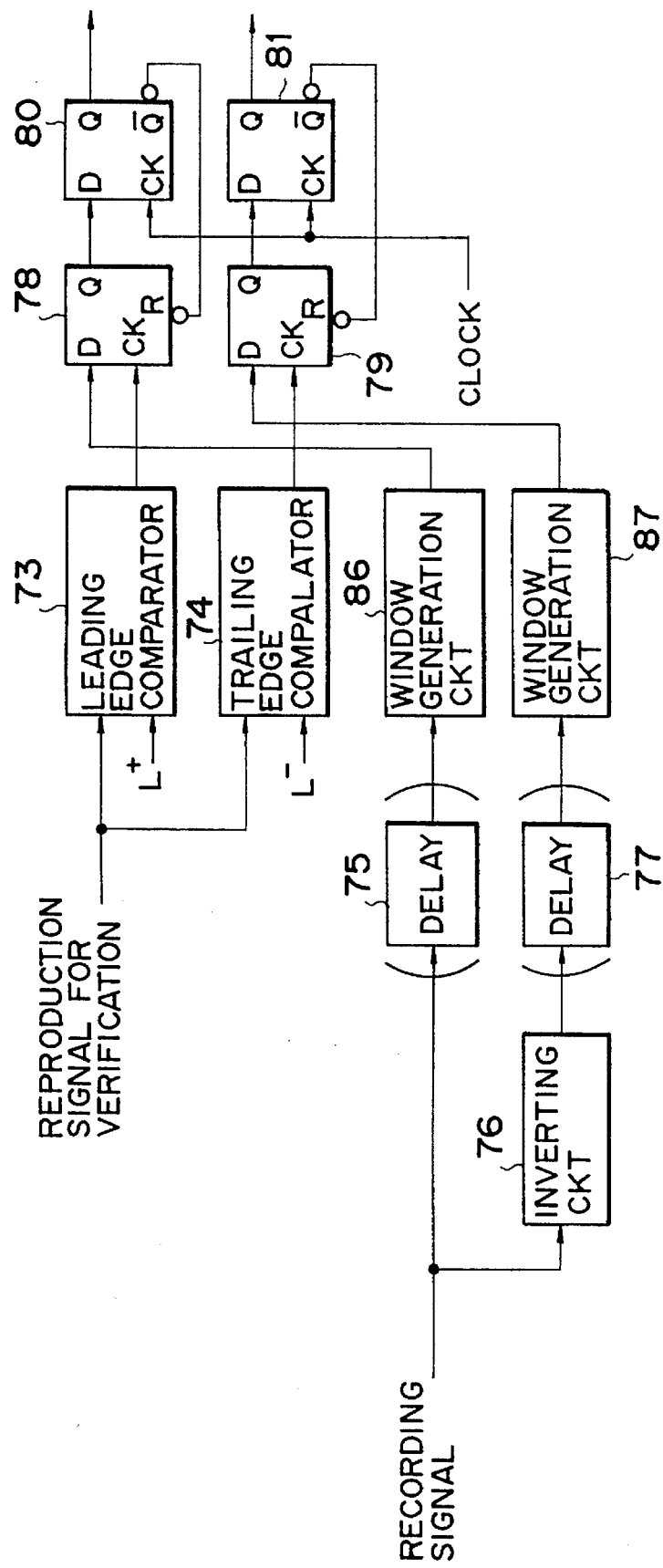
FIG. 18 is a block diagram showing a modification of peripheral circuits of comparators in the fourth embodiment.
Figure 19:
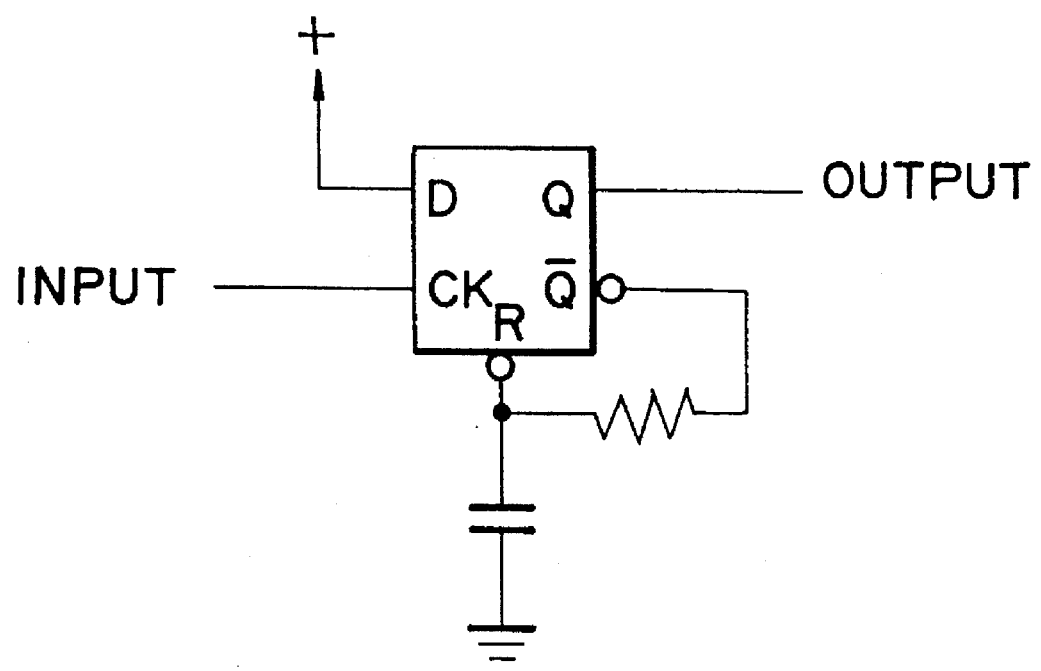
FIG. 19 is a circuit diagram showing an arrangement of a window generation circuit shown in FIG. 18.
Figure 20:
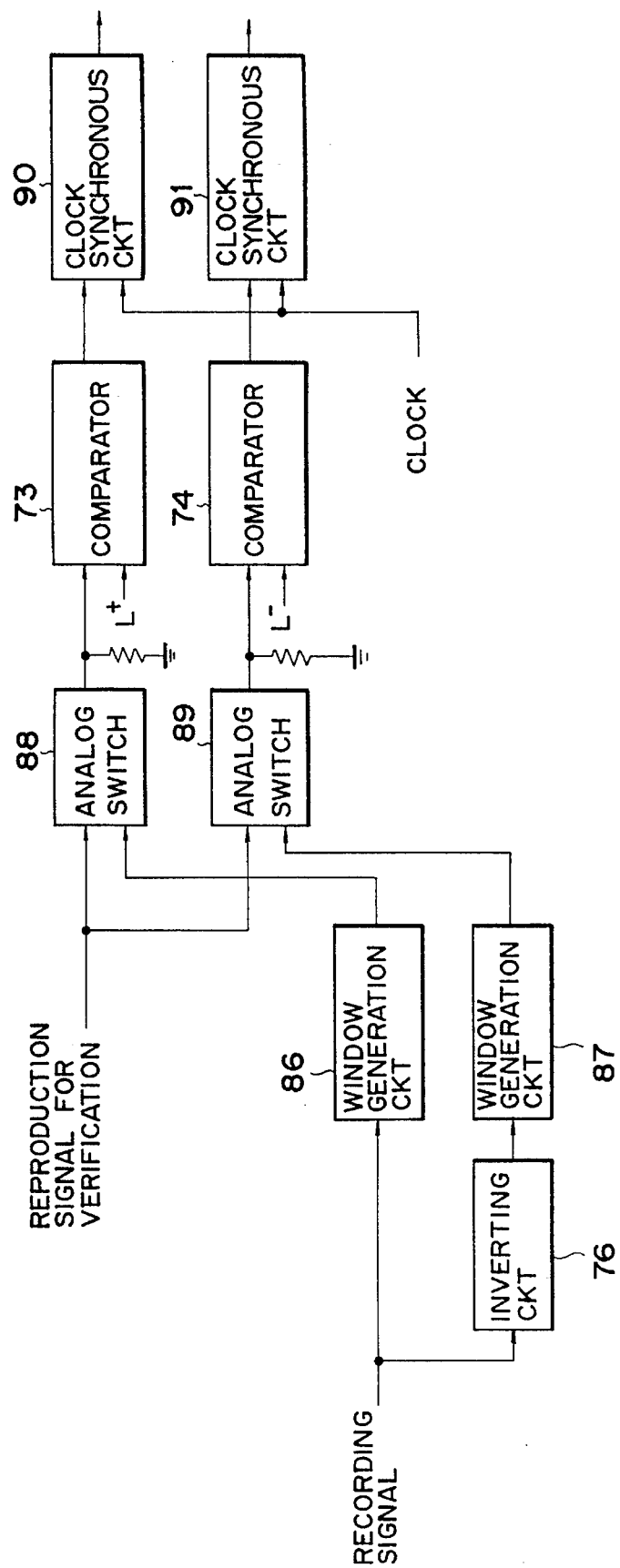
FIG. 20 is a block diagram showing another modification of the peripheral circuits of the comparators in The fourth embodiment.
Figure 21:
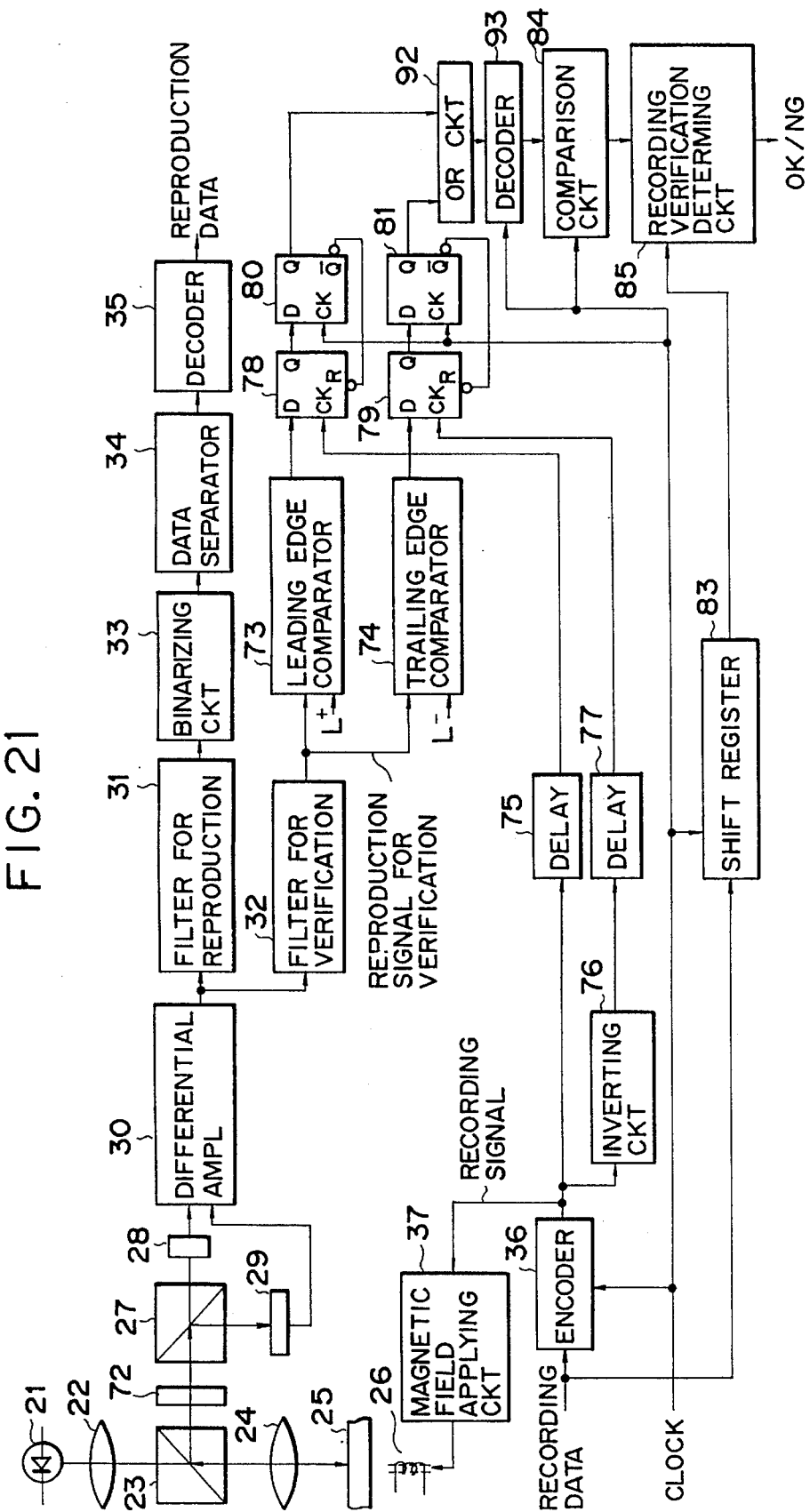
FIG. 21 is a block diagram showing an information recording apparatus according to the fifth embodiment of the present invention.

FIG. 18 is a block diagram showing a modification of peripheral circuits of the comparators in the apparatus shown in FIG. 15. In this modification, window generation circuits 86 and 87 are respectively connected to the input terminals of the flip-flop circuits 78 and 79. Each of the window generation circuits 86 and 87 comprises a monostable multivibrator, as shown in FIG. 19. The window generation circuits 86 and 87 generate window pulses having a predetermined pulse width and phase, and respectively output these pulses to the flip-flop circuits 78 and 79. The flip-flop circuit 78 outputs a binary signal only when the leading edge of the binary signal output from the comparator 73 falls within the duration of the window pulse, and the flip-flop circuit 79 outputs the binary signal only when the trailing edge of the binary signal output from the comparator 74 falls within the duration of the window pulse. Therefore, when the pulse width and phase of the window pulses are properly set, verification can be performed more accurately, FIG. 20 is a block diagram showing another modification of the peripheral circuits of the comparators in the apparatus shown in FIG. 15. The same function as in the embodiment shown in FIG. 15 is realized using analog switches 88 and 89. FIG. 20 illustrates the flip-flop circuits 78 and 80, and the flip-flop circuits 79 and 81 shown in FIG. 15 as clock synchronous circuits 90 and 91, respectively. In this modification, the window pulses generated by the window generators 86 and 87 are output to the corresponding analog switches 88 and 89. The analog switches 88 and 89 are turned on upon reception of the window pulses, and respectively output a reproduction signal for verification to the comparators 73 and 74 in the next stage. Therefore, when the window pulses, which are delayed by a predetermined period of time with respect to the recording signal, are output, only components corresponding to the leading and trailing edges of the recording signal can be extracted, and other excessive components can be removed like in the embodiment shown in FIG. 15. FIG. 21 is a block diagram showing the fifth embodiment of the present invention. The same reference numerals in FIG. 21 denote the same parts as in FIG. 15, and a detailed description thereof will be omitted. In this embodiment, a signal for recording verification is decoded to original recording data using an OR circuit 92 and a decoder 93, and thereafter, the decoded data is compared with recording data supplied from a shift register 83, thereby determining a recording verification result.

As described above, according to the present invention, since only a recording signal is extracted from a reproduction signal reproduced simultaneously with recording, the influence of an old data component, included in the reproduction signal, on a medium can be completely removed, and verification simultaneously with recording can be effectively performed with high reliability. Trial recording is performed to execute verification simultaneously with recording, and the verification simultaneously with recording or verification after completion of recording is selected according to the verification result. Thus, a proper verification mode can be automatically selected according to the number of old data components. Therefore, when the number of old data components is small, verification simultaneously with recording is performed; when the number of old data components is large, verification after completion of recording is performed. Therefore, verification can be performed with high reliability without being influenced by old data components included in a reproduction signal. In addition, since only components corresponding to edges of a recording signal are extracted from a reproduction signal for verification, and excessive components generated by, e.g., interference are removed, a signal for recording verification, from which old information components are completely removed, can be obtained, and the reliability of verification can be further improved.

The present invention allows various other applications in addition to the embodiments described above.

For example, the above embodiments have exemplified a magnetooptical recording apparatus. However, the present invention is applicable to apparatuses other than the magnetooptical recording apparatus as long as they can reproduce a recorded signal simultaneously with recording. The present invention includes all these applications without departing from the scope of claims.

What is claimed is:

1. An apparatus for recording new information on a recording medium, on which information was previously recorded, comprising:

a memory for storing the new information;

overwriting means for overwriting the new information on the previously recorded information by scanning the medium with a light beam;

a photodetector for receiving the light beam reflected by the medium, and reproducing a signal including both the previously recorded information and the new information, while simultaneously performing the overwriting by said overwriting means;

an extraction circuit for extracting a signal component corresponding to the new information from the signal reproduced by said photodetector, said extraction circuit comprising (i) a separation circuit comprising a high pass filter for separating frequency components corresponding to leading and trailing edges of a signal of the new information from the reproduced signal, (ii) a comparator for comparing an output from said high pass filter with a reference value and (iii) a signal generation circuit for generating the signal components on the basis of an output from said comparator;

a comparison circuit for comparing the signal component extracted by said extraction circuit with the new information stored in said memory; and a determining circuit for determining, based on an output from said comparison circuit, whether or not recording is normally performed.

2. An apparatus according to claim 1, further comprising a control circuit for, when said determining circuit determines that recording is not normally performed, performing processing for re-recording the new information on the medium.

3. An apparatus according to claim 1, wherein the medium comprises a magnetooptical recording medium, and said overwriting means comprises an optical head for radiating a non-modulated light beam onto the medium, and a magnetic head for applying a magnetic field modulated according to information onto the medium.

4. A magnetooptical recording apparatus comprising:

a memory for storing a recording signal;

an optical head for scanning a magnetooptical recording medium with a non-modulated light beam;

a magnetic head for applying a magnetic field modulated according to the recording signal on the medium;

a photodetector for receiving the light beam reflected by the medium, and reproducing a signal;

a first filter for extracting a high-frequency component of the signal reproduced by said photodetector;

a second filter for extracting a low-frequency component of the signal reproduced by said photodetector;

a binarizing circuit for generating a binary signal from outputs from said first and second filters;

a selection switch for selectively inputting the outputs from said first and second filters to said binarizing circuit;

a comparison circuit for comparing the binary signal generated by said binarizing circuit with the recording signal stored in said memory; and a determining circuit for determining, based on a comparison result from said comparison circuit, whether or not recording is normally performed.

5. An apparatus according to claim 4, wherein said binarizing circuit comprises a first binarizing circuit for generating a binary signal from the output from said first filter, and a second binarizing circuit for generating a binary signal from the output from said second filter.

6. An apparatus according to claim 4, further comprising:

an encoder for generating the recording signal from recording data; and a decoder for reproducing data from the output from said binarizing circuit.

7. An apparatus according to claim 4, wherein said memory comprises a delay circuit.

8. A magnetooptical recording apparatus comprising:

a memory for storing a recording signal;

an optical head for scanning a magnetooptical recording medium with a non-modulated light beam;

a magnetic head for applying a magnetic field modulated according to the recording signal on the medium;

a photodetector for receiving the light beam reflected by the medium, and reproducing a signal;

a filter for extracting a high-frequency component of the signal reproduced by said photodetector;

a selection switch for selecting one of an output signal from said filter and the reproduction signal;

a binarizing circuit for generating a binary signal from the signal selected by said selection switch;

a comparison circuit for comparing the binary signal generated by the binarizing circuit with the recording signal stored in said memory;

a determining circuit for determining, based on a comparison result from said comparison circuit, whether or not recording is normally performed;

an encoder for generating the recording signal from recording data; and a decoder for reproducing data from the output from said binarizing circuit.

9. An apparatus according to claim 8, wherein said memory comprises a delay circuit.

10. A method of recording a recording signal on a recording medium, and verifying the recorded signal, comprising the steps of:

recording a first test signal having a predetermined pattern on the medium;

overwriting a second test signal having a pattern different from the pattern of the first test signal on the medium on which the first test signal has been recorded;

reproducing a signal from the medium while simultaneously performing the overwriting;

determining a predetermined threshold value and binarizing the reproduced signal using the predetermined threshold value;

comparing the reproduced signal with the second test signal to determine whether or not recording is normally performed;

recording the recording signal on the medium and performing verification while simultaneously recording the recording signal when it is determined that recording is normally performed; and recording the recording signal on the medium and performing verification after completion of recording when it is determined that recording is not normally performed.

11. An apparatus for recording a recording signal on a recording medium, and verifying the recorded signal, comprising:

a pattern generator for generating a first test signal having a predetermined pattern, and a second test signal having a pattern different from the pattern of the first test signal;

a separator for selecting one of the recording signal and the first and second test signals;

recording means for recording the signal selected by said separator on the medium;

reproducing means for reproducing a signal from the medium;

a first comparison circuit for comparing the signal reproduced by said reproducing means with the signal selected by said separator while simultaneously recording a signal by said recording means;

a second comparison circuit for comparing the signal reproduced by said reproducing means with the recording signal after completion of recording by said recording means; and a controller for verifying the signal recorded on the medium by selectively using said first and second comparison circuits, said controller selecting one of said first and second comparison circuits on the basis of a result obtained by comparing the reproduced signal and the second test signal by said first comparison means while simultaneously overwriting the second test signal on the medium recorded with the first test signal;

a binarizing circuit for binarizing a signal reproduced by said reproducing means; and a determining circuit for determining a threshold value of said binarizing circuit.

12. An apparatus according to claim 11, wherein said determining circuit determines the threshold value of said binarizing means, so that a binary signal has a duty of 50% when a signal reproduced by said reproducing means while simultaneously overwriting the second test signal on the medium recorded with the first test signal is binarized by said binarizing circuit.

13. An apparatus according to claim 11, further comprising:

an encoder for generating the recording signal from recording data; and a decoder for reproducing data from the output from said binarizing circuit.

14. A magnetooptical recording apparatus comprising:

a memory for storing a recording signal;

an optical head for scanning a magnetooptical recording medium with a non-modulated light beam;

a magnetic head for applying a magnetic field modulated according to the recording signal on the medium;

a photodetector for receiving the light beam reflected by the medium, and reproducing a signal;

an extraction circuit for extracting high-frequency components of the signal reproduced by said photodetector;

a separation circuit for separating signal components corresponding to leading and trailing edges of the recording signal from the high-frequency components extracted by said extraction circuit, Said separating circuit comprising a comparator for comparing the high-frequency components with a reference value, a delay circuit for delaying the recording signal, and a latch circuit for latching the output from said comparator in response to the leading and trailing edges of the recording signal delayed by said delay circuit;

a generation circuit for generating a verifying signal from the separated signal components;

a comparison circuit for comparing the verifying signal generated by said generation circuit with the recording signal stored in said memory; and a determining circuit for determining, based on a comparison result from said comparison circuit, whether or not recording is normally performed.

15. An apparatus according to claim 14, further comprising a synchronous circuit for synchronizing an output from said latch circuit with a clock signal.

16. An apparatus according to claim 14, wherein said comparator comprises first and second comparators for respectively comparing the high-frequency components with first and second reference values having different polarities, said delay circuit comprises a first delay circuit for delaying the recording signal, an inverting circuit for inverting the recording signal, and a second delay circuit for delaying the signal inverted by said inverting circuit, and said latch circuit comprises a first flip-flop circuit for latching an output signal from said first comparator in response to a signal output from said first delay circuit, and a second flip-flop circuit for latching an output signal from said second comparator in response to a signal output from said second delay circuit.

17. An apparatus according to claim 16, further comprising third and fourth flip-flop circuits for synchronizing output signals from said first and second flip-flop circuits with a clock signal.

18. An apparatus according to claim 17, wherein said generation circuit comprises a fifth flip-flop circuit for synthesizing output signals from said third and fourth flip-flop circuits.

19. An apparatus according to claim 14, wherein said memory comprises a shift register.

20. An apparatus according to claim 14, wherein said extraction circuit comprises a high-frequency differential circuit.

21. An apparatus according to claim 14, further comprising:

a filter for removing high-frequency components of the signal reproduced by said photodetector;

a binarizing circuit for binarizing an output signal from said filter; and a decoder for reproducing data from an output signal from said binarizing circuit.

22. An apparatus according to claim 14, wherein said separation circuit comprises a comparator for comparing the high-frequency components with a reference value, a window generation circuit for generating a window pulse from the recording signal, and a limiting circuit for allowing an output signal from said comparator to pass therethrough only during a time period wherein the window pulse is output from said window generation circuit.

23. An apparatus according to claim 22, further comprising a synchronous circuit for synchronizing an output from said limiting circuit with a clock signal.

24. An apparatus according to claim 22, wherein said comparator comprises first and second comparators for respectively comparing the high-frequency components with first and second reference values having different polarities, said window generation circuit comprises a first window generation circuit for generating a window pulse on the basis of the recording signal, an inverting circuit for inverting the recording signal, and a second window generation circuit for generating a window pulse on the basis of the signal inverted by said inverting circuit, and said limiting circuit comprises a first flip-flop circuit for allowing an output signal from said first comparator to pass therethrough only during a time period wherein said first window generation circuit outputs the window pulse, and a second flip-flop circuit for allowing an output signal from said second comparator to pass therethrough only during a time period wherein said second window generation circuit outputs the window pulse.

25. An apparatus according to claim 24, further comprising third and fourth flip-flop circuits for synchronizing output signals from said first and second flip-flop circuits with a clock signal.

26. An apparatus according to claim 24, further comprising:

a first delay circuit for delaying the recording signal, and supplying the delayed recording signal to said first window generation circuit; and a second delay circuit for delaying the signal inverted by said inverting circuit, and supplying the delayed inverted signal to said second window generation circuit.

27. An apparatus according to claim 14, wherein said separation circuit comprises a window generation circuit for generating a window pulse from the recording signal, an analog switch for allowing the high-frequency components to pass therethrough only during a time period wherein said window generation circuit outputs the window pulse, and a comparator for comparing the high-frequency components passing through said analog switch with a reference value.

28. An apparatus according to claim 27, further comprising a syschronous circuit for synchronizing an output from said comparator with a clock signal.

29. An apparatus according to claim 27, wherein said window generation circuit comprises a first window generation circuit for generating a window pulse on the basis of the recording signal, an inverting circuit for inverting the recording signal, and a second window generation circuit for generating a window pulse on the basis of the signal inverted by said inverting circuit, said analog switch comprises a first analog switch for allowing the high-frequency components to pass therethrough only during a time period wherein said first window generation circuit outputs the window pulse, and a second analog switch for allowing the high-frequency components to pass therethrough only during a time period wherein said second window generation circuit outputs the window pulse, and said comparator comprises a first comparator for comparing the high-frequency components passing through said first analog switch with a first reference value, and a second comparator for comparing the high-frequency components passing through said second analog switch with a second reference value having a polarity opposite to the first reference value.

30. A magneto-optical recording and/or reproducing apparatus for effecting direct overwriting by a magnetic field modulation recording method, said apparatus comprising:

reproducing means for reproducing a magneto-optical signal including both a previously recorded old signal and a newly recorded signal upon recording data onto a recording medium;

separating means, comprising a high-pass filter, for separating the old signal and the new signal from the reproduced signal by detecting a difference in leading velocity between the old signal and the new signal, wherein said separating means separates the new signal and the old signal by detecting a difference in frequency component between the old signal and the new signal;

verifying means for extracting only the new signal component and fop verifying the recorded data by comparing the extracted new signal component with the data;

a comparator for comparing an output of the high-pass filter with a reference value; and a signal generating circuit for detecting leading and trailing edge components of the new signal from an output of said comparator.

31. A magneto-optical recording and/or reproducing apparatus for effecting direct overwriting by a magnetic field modulation recording method, said apparatus comprising:

reproducing means for reproducing a magneto-optical signal including both a previously recorded old signal and a newly recorded signal upon recording data onto a recording medium;

separating means, comprising a high-pass filter, for separating the old signal and the new signal from the reproduced signal by detecting a difference in leading velocity between the old signal and the new signal, wherein said separating means separates the new signal and the old signal by detecting a difference in frequency component between the old signal and the new signal:

verifying means for extracting only the new signal component and for verifying the recorded data by comparing the extracted new signal component with the data;

a low-pass filter into which said magneto-optical reproduction signal is inputted;

a binarizing circuit for binarizing either one of an output from said low-pass filter and an output from said high-pass filter; and a change-over switch for causing the outputs of said low-pass filter and said high-pass filter to be selectively inputted into said binarizing circuit.

32. An apparatus according to claim 31, wherein said change-over switch causes the output from said high-pass filter to be inputted into said binarizing circuit upon recording of information and causes the output from said low-pass filter to be inputted into said binarizing circuit upon reproduction of information.

33. A magneto-optical recording and/or reproducing apparatus for effecting direct overwriting by a magnetic field modulation recording method, said apparatus comprising:

reproducing means for reproducing a magneto-optical signal including both previously recorded old signal and a newly recorded signal upon recording data onto a recording medium;

separating means, comprising a high-pass filter, for separating the old signal and the new signal from the reproduced signal by detecting a difference in leading velocity between the old signal add the new signal, wherein said separating means separates the new signal and the old signal by detecting a difference in frequency component between the old signal and the new signal;

verifying means for extracting only the new signal component and for verifying the recorded data by comparing the extracted new signal component with the data;

a low-pass filter into which said magneto-optical reproduction signal is inputted;

a first binarizing circuit for binarizing an output from said high-pass filter; and a second binarizing circuit for binarizing an output from said low-pass filter, wherein an output from said first binarizing circuit is used upon recording of information and an output from said second binarizing circuit is used upon reproduction of information.

34. A magneto-optical recording and/or reproducing apparatus for effecting direct overwriting by a magnetic field modulation recording method, said apparatus comprising:

reproducing means for reproducing a magneto-optical signal including both a previously recorded old signal and a newly recorded signal upon recording data onto a recording medium;

separating means, comprising a high-pass filter, for separating the old signal and the new signal from the reproduced signal by detecting a difference in leading velocity between the old signal and the new signal, wherein said separating means separates the new signal and the old signal by detecting a difference in frequency component between the old signal and the new signal;

verifying means for extracting only the new signal component and for verifying the recorded data by comparing the extracted new signal component with the data;

a binarizing circuit for binarizing either one of an output of said high-pass filter and said magneto-optical reproduction signal; and a change-over switch for causing the output from said high-pass filter and said magneto-optical reproduction signal to be selectively inputted into said binarizing circuit.

35. An apparatus according to claim 34, wherein said change-over switch causes the output from said high-pass filter to be inputted into said binarizing circuit upon recording of information and causes said magneto-optical reproduction signal to be inputted into said binarizing circuit upon reproduction of information.

* * * * *

UNITED STATES PATENT AND TRADEMARK OFFICE
CERTIFICATE OF CORRECTION

PATENT NO. : 5,485,433
DATED : January 16, 1996
INVENTOR(S) : Seiichiro SATOMURA, et al.

It is certified that error appears in the above-indentified patent and that said Letters Patent is hereby corrected as shown below:

ON THE COVER PAGE:

Under "FOREIGN PATENT DOCUMENTS," item [56]

"0294761   12/1988   European Pat. Off."

should read

--0294761   12/1988   European Pat. Off.
  0437308   7/1991   European Pat. Off.--; and "03049077   3/1991   Japan
  03073448   3/1991   Japan
    373448   3/1991   Japan
  03156775   7/1991   Japan"

should read

--3-049077   3/1991   Japan
  3-073448   3/1991   Japan
  3-156775   7/1991   Japan--.

Figure 2:
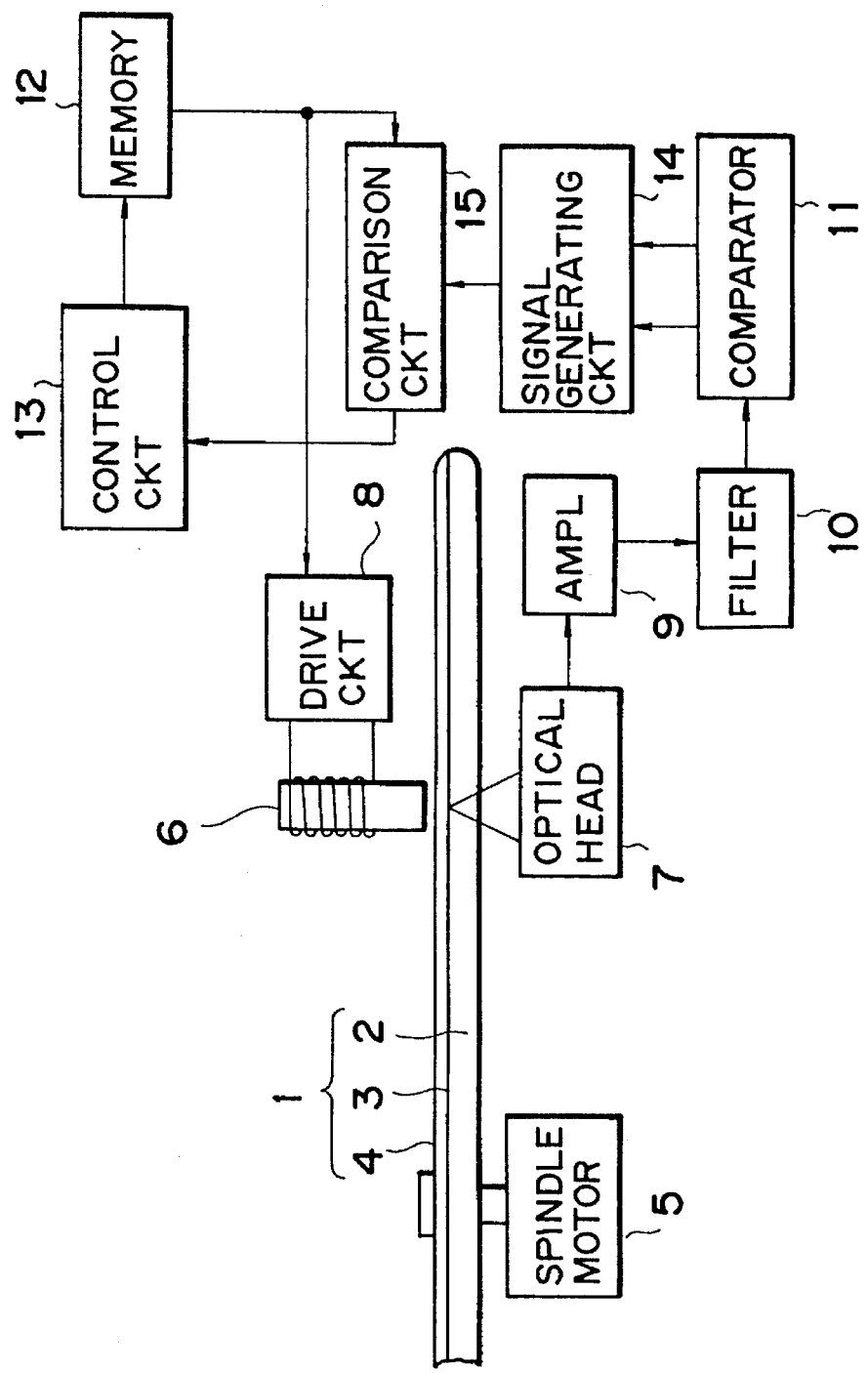
FIG. 2 is a block diagram showing an information recording apparatus according to the first embodiment of the present invention.

IN THE DRAWING SHEETS:

Sheet 1 of 21:

Figure 1, "MEAD" should read --HEAD--;

UNITED STATES PATENT AND TRADEMARK OFFICE
CERTIFICATE OF CORRECTION

PATENT NO. : 5,485,433        Page 2 of 6
DATED : January 16, 1996
INVENTOR(S) : Seiichiro SATOMURA, et al.

Figure 4B:
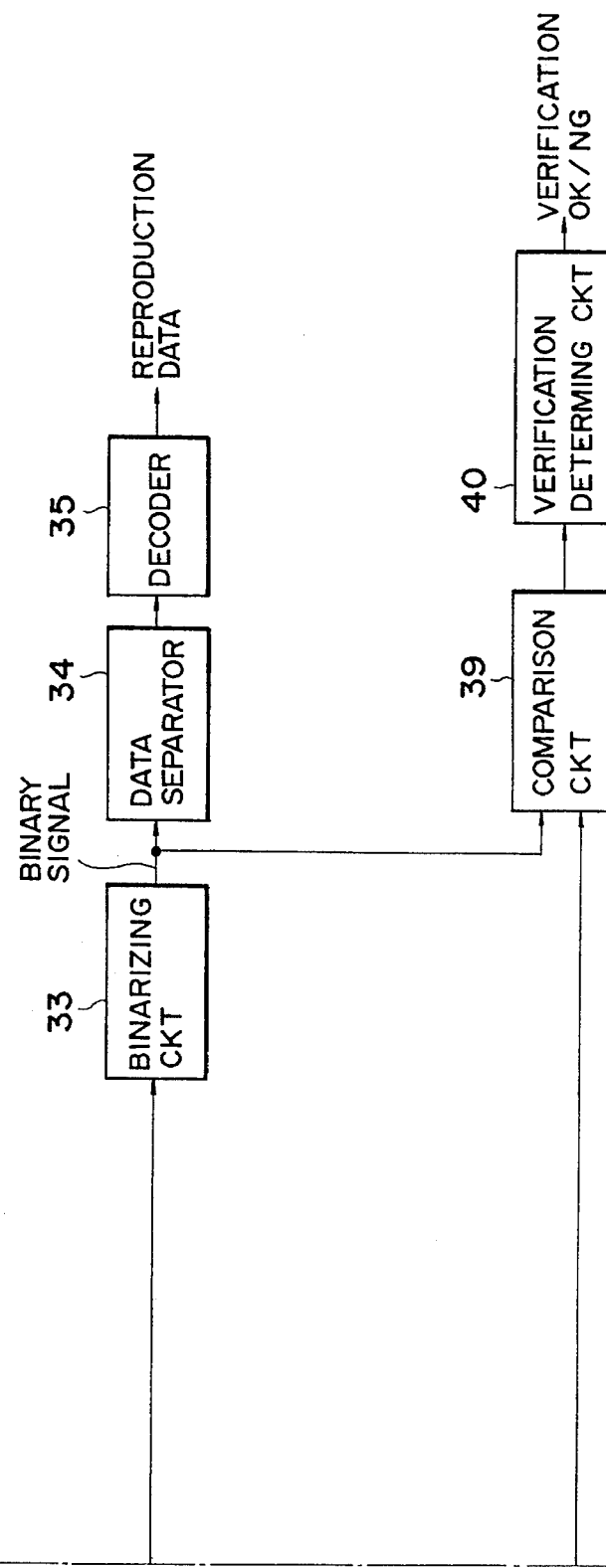
Figure 11:
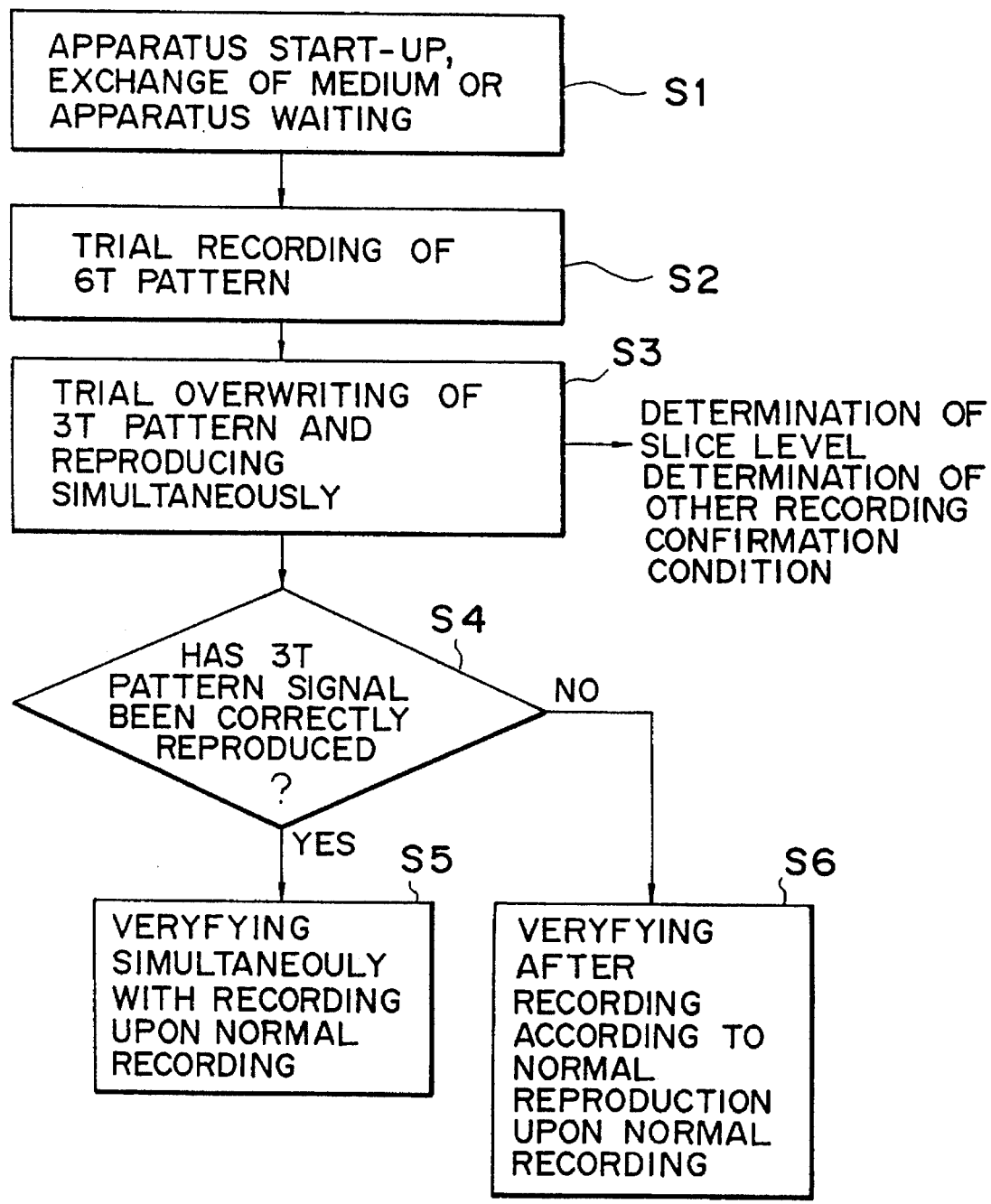
FIG. 11 is a flow chart for explaining a test recording sequence in the third embodiment.

It is certified that error appears in the above-indentified patent and that said Letters Patent is hereby corrected as shown below:

<u>IN THE DRAWING SHEETS</u> (Cont.):

<u>Sheet 5 of 21</u>:

Figure 4B, "DETERMING" should read --DETERMINING--;

<u>Sheet 7 of 21</u>:

Figure 6B, "DELECTION" should read --DETECTION--;

<u>Sheet 10 of 21</u>:

Figure 10, In element 58, "DETERMING" should read --DETERMINING--;

<u>Sheet 11 of 21</u>:

Figure 11, In step S5, "SIMULTANEOULY" should read --SIMULTANEOUSLY--;

<u>Sheet 15 of 21</u>:

Figure 15, In element 85, "DETERMING" should read --DETERMINING--;

UNITED STATES PATENT AND TRADEMARK OFFICE
CERTIFICATE OF CORRECTION

PATENT NO. : 5,485,433
DATED : January 16, 1996
INVENTOR(S) : Seiichiro SATOMURA, et al.

It is certified that error appears in the above-indentified patent and that said Letters Patent is hereby corrected as shown below:

IN THE DRAWING SHEETS (Cont.):

Sheet 18 of 21:

Figure 18, In element 74, "COMPALATOR" should read --COMPARATOR--; and

Sheet 21 of 21:

Figure 21, In element 85, "DETERMING" should read --DETERMINING--.

COLUMN 1:

Line 13, "perform" should read --perform a--;
Line 34, "magnetooptlcal" should read --magnetooptical--; and
Line 56, "magnetooptlcal" should read --magnetooptical--.

COLUMN 3:

Line 42, "tile" should read --the--.

UNITED STATES PATENT AND TRADEMARK OFFICE
CERTIFICATE OF CORRECTION

PATENT NO. : 5,485,433
DATED : January 16, 1996
INVENTOR(S) : Seiichiro SATOMURA, et al.

It is certified that error appears in the above-indentified patent and that said Letters Patent is hereby corrected as shown below:

COLUMN 5:

Line 55, "magnetooptlcal" should read --magnetooptical--.

COLUMN 6:

Line 18, "FIGS. 4A to 4B are block diagram showing" should read --FIG. 4 includes FIGS. 4A and 4B, which show--;
Line 57, "The" should read --the--.

COLUMN 9:

Line 38, "cad" should read --can--.

COLUMN 10:

Line 8, "anti" should read --and--.

COLUMN 12:

Line 21, "anon;her" should read --another--.

COLUMN 14:

Line 19, "Shows" should read --shows--;

UNITED STATES PATENT AND TRADEMARK OFFICE
CERTIFICATE OF CORRECTION

PATENT NO. : 5,485,433      Page 5 of 6
DATED : January 16, 1996
INVENTOR(S) : Seiichiro SATOMURA, et al.

It is certified that error appears in the above-indentified patent and that said Letters Patent is hereby corrected as shown below:

Line 37, "Infor-" should read --infor- --;
    Line 46, "tions" should read --tion--.

COLUMN 15:

Line 46, "a" should be deleted.

COLUMN 16:

Line 10, "Information" should read --information--;
    Line 67, "signal," should read --signal.--.

COLUMN 18:

Line 23, "The" should read --the--.

COLUMN 23:

Line 8, "Said" should read --said--; and
    Line 29, "different:" should read --different--.

COLUMN 24:

Line 46, "syschronous" should read --synchronous--.

UNITED STATES PATENT AND TRADEMARK OFFICE
CERTIFICATE OF CORRECTION

PATENT NO. : 5,485,433
DATED : January 16, 1996
INVENTOR(S) : Seiichiro SATOMURA, et al.

It is certified that error appears in the above-indentified patent and that said Letters Patent is hereby corrected as shown below:

COLUMN 25:

Line 16, "fop" should read --for--.

COLUMN 26:

Line 2, "both" should read --both a--; and
Line 8, "add" should read --and--.

Signed and Sealed this

Sixth Day of August, 1996

Attest:

BRUCE LEHMAN

Attesting Officer

Commissioner of Patents and Trademarks